United States Patent
Jimenez Cordon et al.

(10) Patent No.: US 12,408,087 B2
(45) Date of Patent: Sep. 2, 2025

(54) METHODS SUPPORTING A CAPABILITY TO MODIFY SESSION TRAFFIC IN RESPONSE TO A HANDOVER AND RELATED NETWORK NODES

(71) Applicant: Telefonaktiebolaget LM Ericsson (publ), Stockholm (SE)

(72) Inventors: Carlos Jimenez Cordon, Madrid (ES); Juan Jose Delgado Reimundez, Madrid Madrid (ES); Javier Muñoz Kirschberg, Madrid (ES); Miguel Angel Muñoz De La Torre Alonso, Madrid (ES); Rodrigo Alvarez Dominguez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 18/014,084

(22) PCT Filed: Dec. 11, 2020

(86) PCT No.: PCT/EP2020/085865
§ 371 (c)(1),
(2) Date: Dec. 30, 2022

(87) PCT Pub. No.: WO2022/002426
PCT Pub. Date: Jan. 6, 2022

(65) Prior Publication Data
US 2023/0276306 A1    Aug. 31, 2023

(30) Foreign Application Priority Data
Jul. 2, 2020  (EP) .................................... 20382596

(51) Int. Cl.
*H04W 36/00* (2009.01)
*H04W 76/10* (2018.01)

(52) U.S. Cl.
CPC ........ *H04W 36/0011* (2013.01); *H04W 76/10* (2018.02)

(58) Field of Classification Search
CPC .......................... H04W 36/0011; H04W 76/10
See application file for complete search history.

(56) References Cited

U.S. PATENT DOCUMENTS

2021/0014742 A1* 1/2021 Wang ................ H04W 36/0027
2021/0385704 A1* 12/2021 Mayer .................. H04W 76/30

FOREIGN PATENT DOCUMENTS

EP          3477993 A1     5/2019
WO   WO-2018111029 A1 *  6/2018   ........ H04W 36/0033
(Continued)

OTHER PUBLICATIONS

Machine Translation of WO 2018111029 A1 (Year: 2018).*
(Continued)

*Primary Examiner* — Khaled M Kassim
*Assistant Examiner* — Noah James Sugden
(74) *Attorney, Agent, or Firm* — Sage Patent Group

(57) ABSTRACT

A method of operating a user plane function UPF node of a core network CN for a communication network is provided. An association message is transmitted to a session management function SMF node of the CN. The association message includes an indication that the UPF node supports a capability to modify session traffic in response to a handover. A session establishment request message is received from the SMF node. The session establishment request message includes an indication to modify session traffic of a protocol data unit PDU session for the communication device in response to handover. Methods relating to session management function SMF nodes and policy control function PCF nodes are also provided.

24 Claims, 30 Drawing Sheets

(56) References Cited

FOREIGN PATENT DOCUMENTS

| | | | |
|---|---|---|---|
| WO | 2020001795 A1 | 1/2020 | |
| WO | WO-2020218807 A1 * | 10/2020 | ............ H04W 24/08 |

OTHER PUBLICATIONS

Machine Translation of WO 2020218807 A1 (Year: 2020).*

International Search Report and Written Opinion of the International Searching Authority for PCT International Application No. PCT/EP2020/085865 dated Jun. 29, 2021.

3GPP TS 23.502 V16.1.0, "3rd Generation Partnership Project; Technical Specification Group Services and System Aspects; Procedures for the 5G System; Stage 2 (Release 16)," Jun. 2019, 500 pages.

3GPP TS 23.501 V16.0.0, "3rd Generation Partnership Project; Technical Specification Group Services and System Aspects; System Architecture for the 5G System; Stage 2 (Release 16)," Mar. 2019, 318 pages.

3GPP TR 23.748 V0.4.0, "3rd Generation Partnership Project; Technical Specification Group Services and System Aspects; Study on enhancement of support for Edge Computing in 5G Core network (5GC) (Release 17)," Jun. 2020, 189 pages.

Ericsson, "Alignment of terminology and general cleanup," S2-180099, 3GPP TSG-SA WG2 Meeting #125, Gothenburg, Sweden, Jan. 22-26, 2018, 249 pages.

ETSI TS 123 503 V15.8.0, "5G; Policy and charging control framework for the 5G System (5GS); Stage 2 (3GPP TS 23.503 version 15.8.0 Release 15)," Jan. 2020, 85 pages.

3GPP TS 29.244 V16.1.0, "3rd Generation Partnership Project; Technical Specification Group Core Network and Terminals; Interface between the Control Plane and the User Plane Nodes; Stage 3 (Release 16)," Sep. 2019, 243 pages.

* cited by examiner

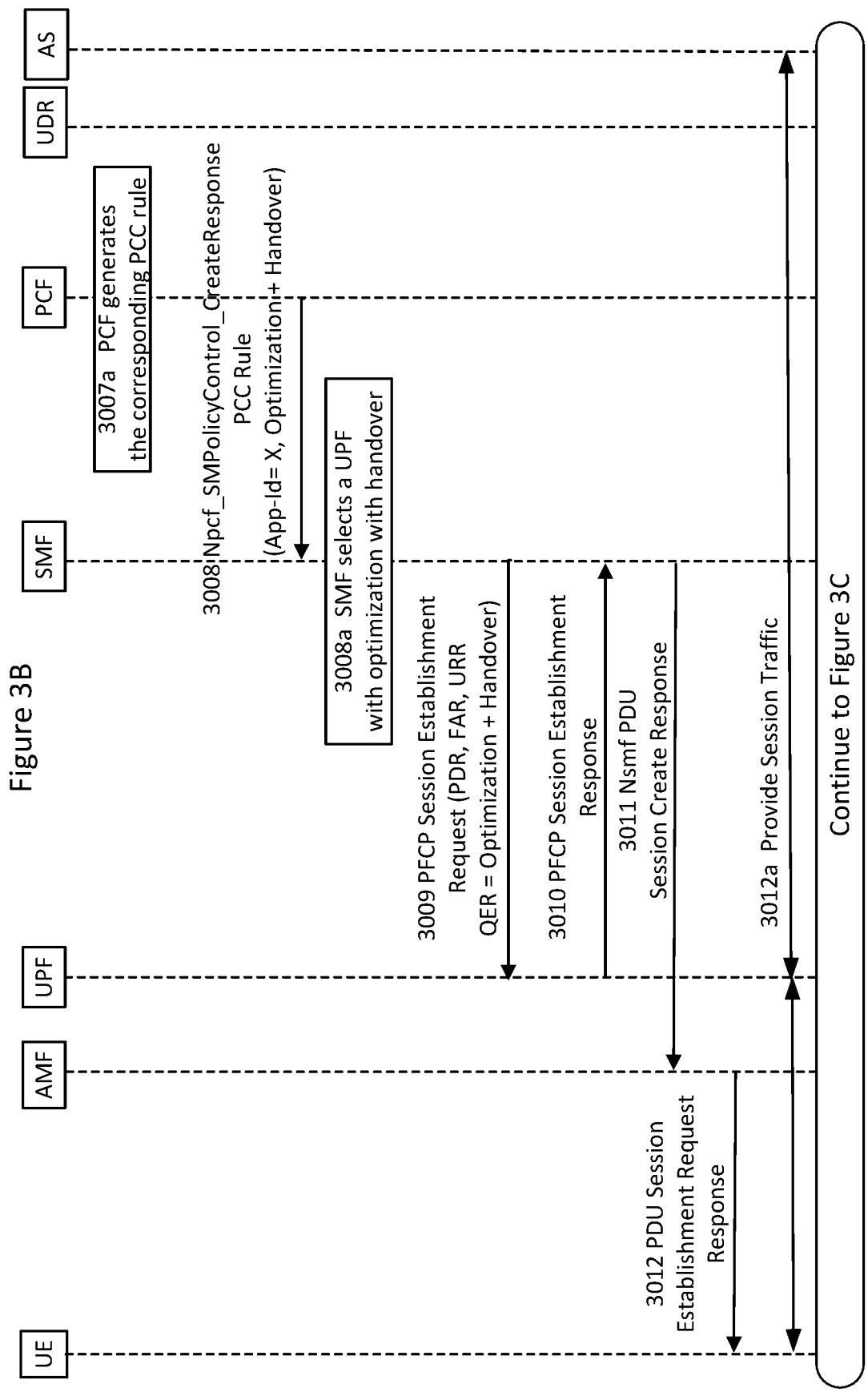

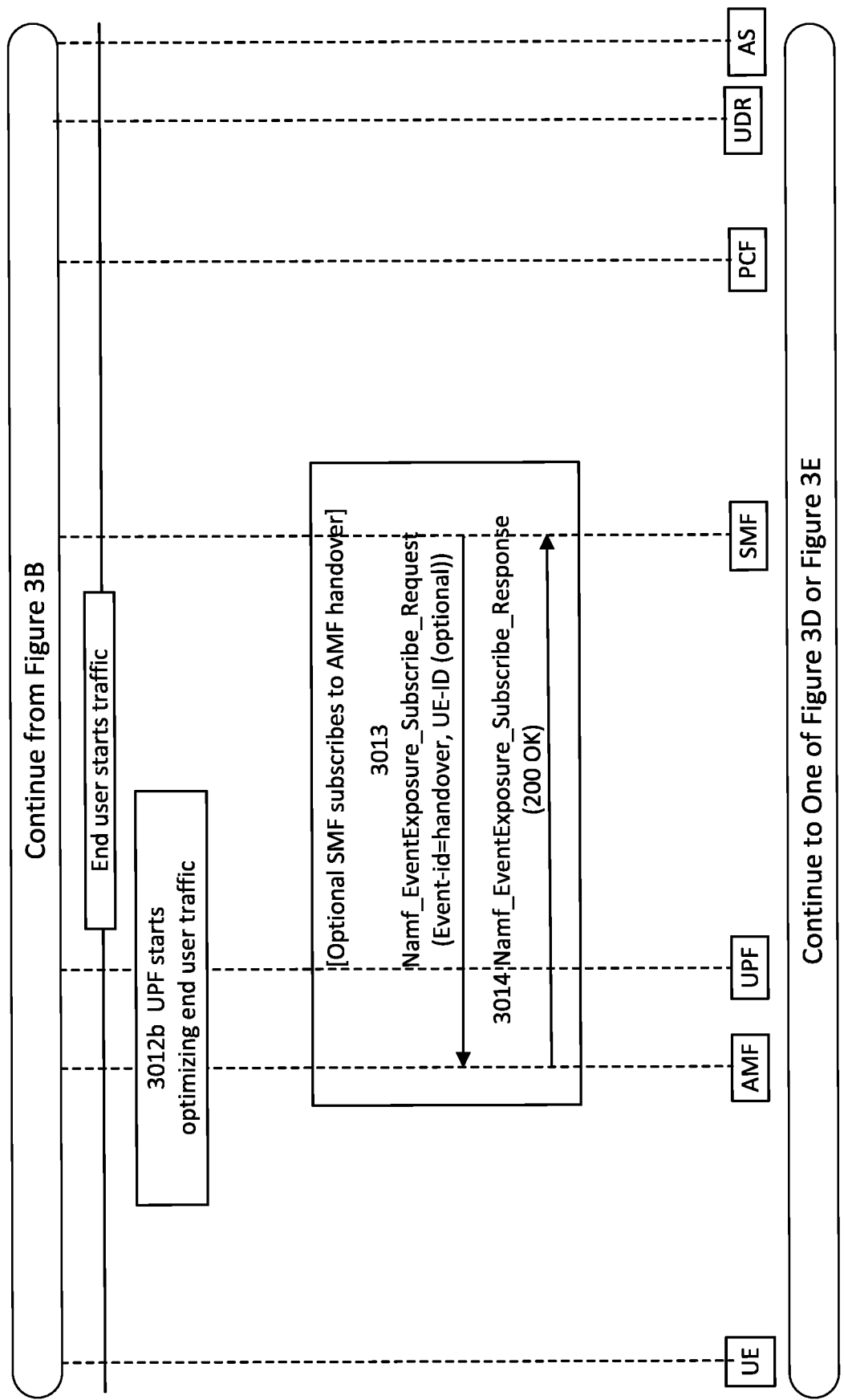

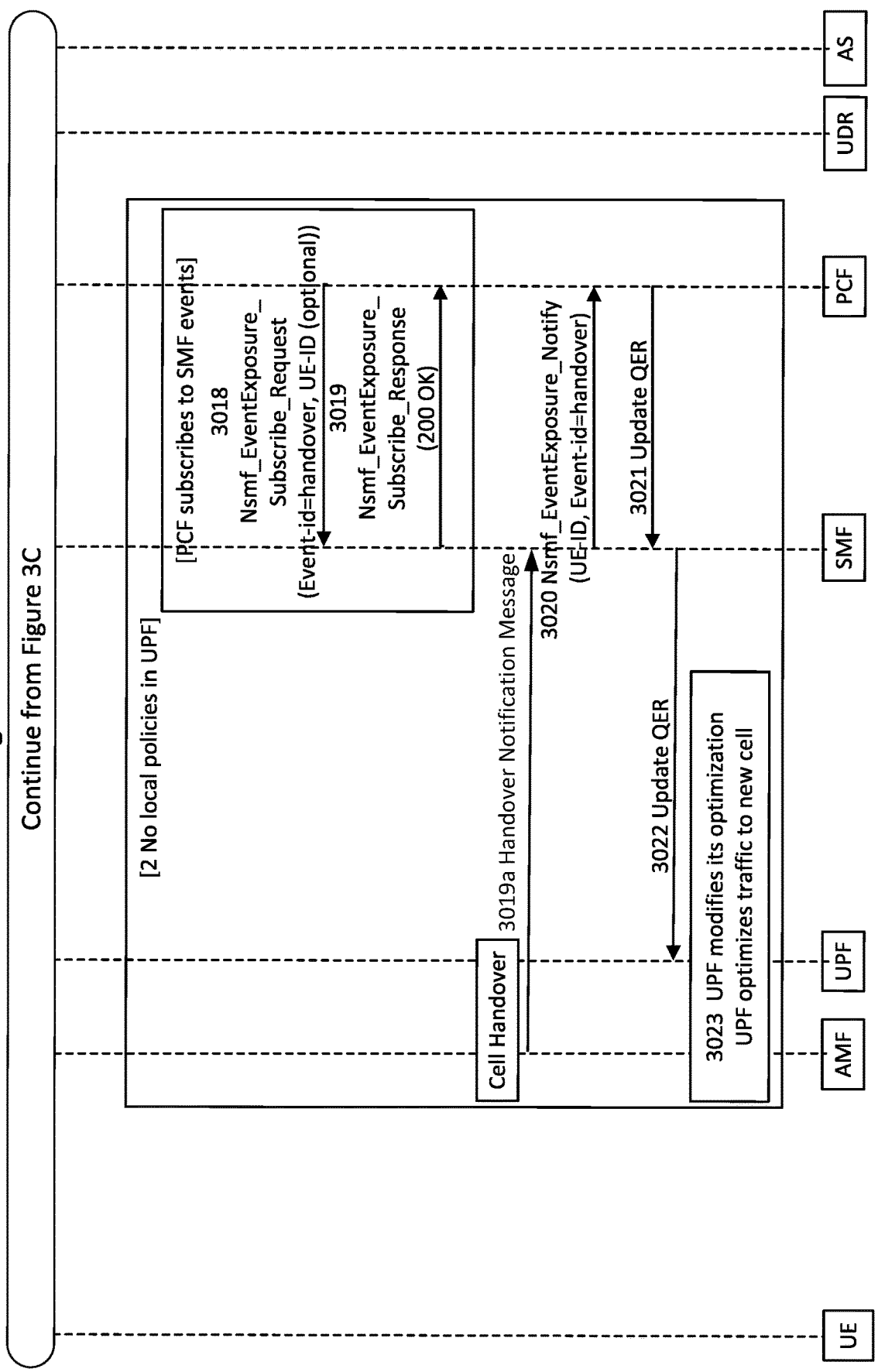

Figure 4A

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation / release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |

Figure 4B

| 7/2 | ADPDP | Sxa, Sxb, Sxc, N4 | The UP function supports the Activation and Deactivation of Pre-defined PDRs (see clause 5.19). |
|---|---|---|---|
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | MNOP | Sxa, Sxb, Sxc, N4 | UPF supports measurement of number of packets which is instructed with the flag 'Measurement of Number of Packets' in a URR. See also 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | The UP function supports redundant transmission at transport layer. |
| 8/3 | VTIME | Sxb,N4 | UPF support of quota validity time feature. |
| 8/4 | HIOP | Sxb, Sxc, N4 | Handover Information Optimization. UPF gets information of handover and optimizes flows or not considering handover of the subscriber. |

Figure 5A

| Octet 1 and 2 | | Create QER IE Type = 7 (decimal) | | | | | |
|---|---|---|---|---|---|---|---|
| Octets 3 and 4 | | Length = n | | | | | |
| Information elements | P | Condition/Comment | Appl. | | | | IE Type |
| | | | Sx a | Sx b | Sx c | N4 | |
| QER ID | M | This IE shall uniquely identify the QER among all the QERs configured for that PFCP session | - | X | X | X | QER ID |
| QER Correlation ID | C | This IE shall be present if the UP function is required to correlate the QERs of several PFCP sessions, for APN-AMBR enforcement of multiple UE's PDN connections to the same APN. | - | X | - | X | QER Correlation ID |
| Gate Status | M | This IE shall indicate whether the packets are allowed to be forwarded (the gate is open) or shall be discarded (the gate is closed) in the uplink and/or downlink directions. | - | X | X | X | Gate Status |

Figure 5B

| Maximum Bitrate | C | This IE shall be present if an MBR enforcement action shall be applied to packets matching this PDR. When present, this IE shall indicate the uplink and/or downlink maximum bit rate to be enforced for packets matching the PDR.<br><br>For EPC, this IE may be set to the value of:<br>- the APN-AMBR, for a QER that is referenced by all the PDRs of the non-GBR bearers of a PDN connection;<br>- the TDF session MBR, for a QER that is referenced by all the PDRs of a TDF session;<br>- the bearer MBR, for a QER that is referenced by all the PDRs of a bearer;<br>- the SDF MBR, for a QER that is referenced by all the PDRs of a SDF.<br><br>For 5GC, this IE may be set to the value of:<br>- the Session-AMBR, for a QER that is referenced by all the PDRs of the non-GBR QoS flows of a PDU session;<br>- the QoS Flow MBR, for a QER that is referenced by all the PDRs of a QoS Flow;<br>- the SDF MBR, for a QER that is referenced by all the PDRs of a SDF. | - | X | X | X | MBR |

Figure 5C

| | | | | | | |
|---|---|---|---|---|---|---|
| Guaranteed Bitrate | C | This IE shall be present if a GBR has been authorized to packets matching this PDR. When present, this IE shall indicate the authorized uplink and/or downlink guaranteed bit rate.<br><br>This IE may be set to the value of:<br>- the aggregate GBR, for a QER that is referenced by all the PDRs of a GBR bearer;<br>- the QoS Flow GBR, for a QER that is referenced by all the PDRs of a QoS Flow (for 5GC);<br>- the SDF GBR, for a QER that is referenced by all the PDRs of a SDF. | - | X | X | X | GBR |
| Packet Rate | C | This IE shall be present if a Packet Rate enforcement action (in terms of number of packets per time interval) shall be applied to packets matching this PDR.<br>When present, this IE shall indicate the uplink and/or downlink maximum packet rate to be enforced for packets matching the PDR.<br>This IE may be set to the value of:<br>- downlink packet rate for Serving PLMN Rate Control, for a QER that is referenced by all PDRs of the UE belonging to the PDN connection using CIoT EPS Optimizations as described in 3GPP TS 23.401 [2]);<br>- uplink and/or downlink packet rate for APN Rate Control, for a QER that is referenced by all the PDRs of the UE belonging to PDN connections to the same APN using CIoT EPS Optimizations as described in 3GPP TS 23.401 [2]). | - | X | - | - | Packet Rate |

Figure 5D

| IE | P | Description | | | | |
|---|---|---|---|---|---|---|
| DL Flow Level Marking | C | This IE shall be set if the UP function is required to mark the packets for QoS purposes:<br>- by the TDF-C, for DL flow level marking for application indication (see clause 5.4.5);<br>- by the PGW-C, for setting the GTP-U Service Class Indicator extension header for service indication towards GERAN (see clause 5.4.12). | - | X | X | - | DL Flow Level Marking |
| QoS flow identifier | C | This IE shall be present if the QoS flow identifier shall be inserted by the UPF. | - | - | - | X | QFI |
| Reflective QoS | C | This IE shall be present if the UP function is required to insert a Reflective QoS Identifier to request reflective QoS for uplink traffic. | - | - | - | X | RQI |
| Paging Policy Indicator | C | This IE shall be present if the UPF is required to set the Paging Policy Indicator (PPI) in outgoing packets (see clause 5.4.3.2 of 3GPP TS 23.501 [28]).<br>When present, it shall be set to the PPI value to set. | - | - | - | X | Paging Policy Indicator |
| Averaging Window | O | This IE may be present if the UP function is required to use a different Averaging window than the default one. (NOTE) | - | - | - | X | Averaging Window |
| Handover Information | O | This IE may be present if the UPF function is required to modify its behavior in case of handover | - | - | - | X | Handover Information |
| Note: | As 5QI is not signaled over N4, one default averaging window shall be pre-configured in the UPF | | | | | |

Figure 6

| Octet 1 and 2 | | Usage Report IE Type = 80 (decimal) | |
|---|---|---|---|
| Octets 3 and 4 | | Length = n | |
| Information elements | P | Condition/Comment | IE Type |
| Handover Information Profile | C | The name of the Handover Information profile | Flow Information Profile |

METHODS SUPPORTING A CAPABILITY TO MODIFY SESSION TRAFFIC IN RESPONSE TO A HANDOVER AND RELATED NETWORK NODES

CROSS REFERENCE TO RELATED APPLICATIONS

This application is a 35 U.S.C. § 371 national stage application of PCT International Application No. PCT/EP2020/085865 filed on Dec. 11, 2020, which claims the benefit of European Patent Application No. 20382596.3, filed on Jul. 2, 2020, the disclosures and content of which are incorporated by reference herein in their entireties.

TECHNICAL FIELD

The present disclosure relates generally to communications, and more particularly to communication methods and related devices and nodes supporting wireless communications.

BACKGROUND

FIG. 1 illustrates the 5G ($5^{th}$ Generation) reference network architecture as defined by 3GPP ($3^{rd}$ Generation Partnership Group) for non-roaming.

Relevant architectural aspects for this disclosure include: AF (Application Function), NEF (Network Exposure Function), PCF (Policy Control Function), SMF (Session Management Function), UPF (User Plane Function), and AMF (Access and Mobility Management Function).

The Application Function (AF, also referred to as Application Function node or AF node) interacts with the 3GPP Core Network, and specifically in the context of this disclosure, to provision information to the network operator and to subscribe to certain events happening in operator's network.

The Network Exposure Function (NEF, also referred to as Network Exposure Function node or NEF node) supports different functionality and specifically in the context of this disclosure, the NEF acts as the entry point into an operator's network, so that an external AF interacts with the 3GPP Core Network through the NEF.

The Policy Control Function (PCF, also referred to as Policy Control Function node or PCF node) supports a unified policy framework to govern the network behavior. For this disclosure, the PCF provides PCC rules to the SMF.

The Session Management function (SMF, also referred to as Session Management Function node or SMF node) supports different functionality, specifically, for this disclosure, the SMF configures the UPF (e.g., for event reporting).

The User Plane function (UPF, also referred to as User Plane Function node or UPF node) supports handling of user plane traffic based on the rules received from SMF, specifically, for this disclosure, packet inspection and different enforcement actions (e.g., event detection and reporting).

The Access Mobility function (AMF, also referred to as Access Mobility Function node or AMF node) receives all connection and session related information from the User Equipment (UE) (N1/N2) but is responsible only for handling connection and mobility management tasks.).

3GPP TS 29.518 v16.3.0 (referred to as Reference [2]) defines services offered by the AMF to other NFs.

The Network Data Analytics Function (NWDAF, also referred to as Network Data Analytics Function node or NWDAF node) is discussed in 3GPP TS 23.288 v16.3.0 (referred to as Reference [3]). The NWDAF represents an operator managed network analytics logical function. The NWDAF is part of the architecture specified in 3GPP TS 23.501 v16.4.0 (referred to as Reference [4]) and uses the mechanisms and interfaces specified for 5GC and OAM.

The NWDAF interacts with different entities for different purposes. The NWDAF provides data collection based on event subscription, provided by AMF, SMF, PCF, UDM, AF (directly or via NEF), and/or Operations, Administration and Maintenance (OAM, also referred to as Operations, Administration and Maintenance node or OAM node). The NWDAF provides retrieval of information from data repositories (e.g., UDR via UDM for subscriber-related information). The NWDAF provides retrieval of information about Network Functions NFs (e.g., NRF for NF-related information, and Network Slice Selection Function NSSF for slice-related information). The NWDAF provides on demand provision of analytics to consumers.

There are multiple traffic algorithms to improve/optimize the user plane traffic payload which may contribute to improve the QoE (Quality of Experience) and/or provide/ensure the required QoS (Quality of Service) as discussed below.

Transmission Control Protocol TCP Improvement/optimization may be provided. Most/many applications today are based on TCP transport (currently the TCP traffic presence is beyond 90% in mobile broadband networks). The TCP protocol was developed in the 1970s and was originally designed for wired communication (not for wireless communications). TCP may not behave well in wireless networks (e.g., transmission errors are usually handled by the protocol as congestion events). Due to the above, different improvements to TCP protocol have been proposed including: improved TCP congestion control algorithms (e.g., CUBIC, and Google's BBR now being standardized at IETF); approaches based on TCP Proxy at network side; Advanced Queue Management AQM based approaches like Controlled Delay CoDel; transparent approaches based on TCP split connection such as the TCP ACK regulator or transparent buffer; etc. Most TCP improvements/optimizations aim to improve user experience by increasing TCP throughput, especially for high demand services, such as Video Streaming.

Domain Name Server DNS improvement/optimization may be provided. DNS requests may be useful/required for every type of traffic. DNS optimizers can improve/reduce the time elapsed to obtain content. Optimizers may provide single user peak throughput for 360°/AR applications. Quic Optimizations may improve QUIC throughput and have a regular Round Trip Time RTT. Existing approaches, however, may suffer reduced performance during handover situations.

SUMMARY

According to some embodiments of inventive concepts, a method of operating a session management function SMF node of a core network CN for a communication network is provided. The method includes receiving an association message from a user plane function UPF node of the CN. The association message includes an indication that the UPF node supports a capability to modify session traffic in response to a handover. The method further includes receiving a protocol data unit PDU session create request message requesting creation of a PDU session for a communication device. The method further includes transmitting a policy control create request message responsive to receiving the PDU session create request message requesting creation of the PDU session for the communication device. The method further includes receiving a policy control create response message after transmitting the policy control create request message. The policy control create response message is in response to the policy control create request message, and the policy control create response message includes an indication that session traffic of the PDU session for the communication device is to be modified in response to handover. The method further includes selecting the UPF node to handle the PDU session for the communication device responsive to the indication that the UPF node supports the capability to modify session traffic in response to handover and responsive to the indication that session traffic of the PDU session for the communication device is to be modified in response to handover. The method further includes transmitting a session establishment request message to the UPF node responsive to selecting the UPF node to handle the PDU session for the communication device. The session establishment request message includes an indication to modify session traffic of the PDU session for the communication device in response to handover.

According to some other embodiments of inventive concept, a method of operating a user plane function UPF node of a core network CN for a communication network is provided. The method includes transmitting an association message to a session management function SMF node of the CN. The association message includes an indication that the UPF node supports a capability to modify session traffic in response to a handover. The method further includes receiving a session establishment request message from the SMF node. The session establishment request message includes an indication to modify session traffic of the PDU session for the communication device in response to handover.

According to some other embodiments of inventive concept, a method of operating a policy control function, PCF, node of a core network, CN, for a communication network is provided. The method includes receiving a policy control create request message for a PDU session for a communication device. The policy control create request message is received from a session management function, SMF, node. The method further includes transmitting a policy control create response message responsive to the policy control create request message. The policy control create response message includes an indication that session traffic of the PDU session for the communication device is to be modified in response to handover, and the policy control create response message is transmitted to the SMF node.

According to some embodiments disclosed herein, a UPF node may notify an SMF node of its capability to modify session traffic in response to a handover, and based on notification of this capability, the SMF node may select the UPF node to handle a PDU session for a communication device where session traffic of the PDU session is to be modified in response to handover. Accordingly, performance of the PDU session for the communication device may be improved during/after handover situations, for example, improving usage of network resources, improving bandwidth efficiency, and/or improving user experience.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 3A, 3B, 3C, and 3D provide a message diagram illustrating operations/messages according to some embodiments of inventive concepts;

FIGS. 3A, 3B, 3C, and 3E provide a message diagram illustrating operations/messages according to some embodiments of inventive concepts;

FIGS. 4A and 4B provide a table illustrating User Plane UP Function Features according to some embodiments of inventive concepts;

FIGS. 5A, 5B, 5C, and 5D provide a table illustrating creation of a QER Information Element IE within a PFCP session establishment request according to some embodiments of inventive concepts;

FIG. 6 is a table illustrating a Flow Information IE according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 7:
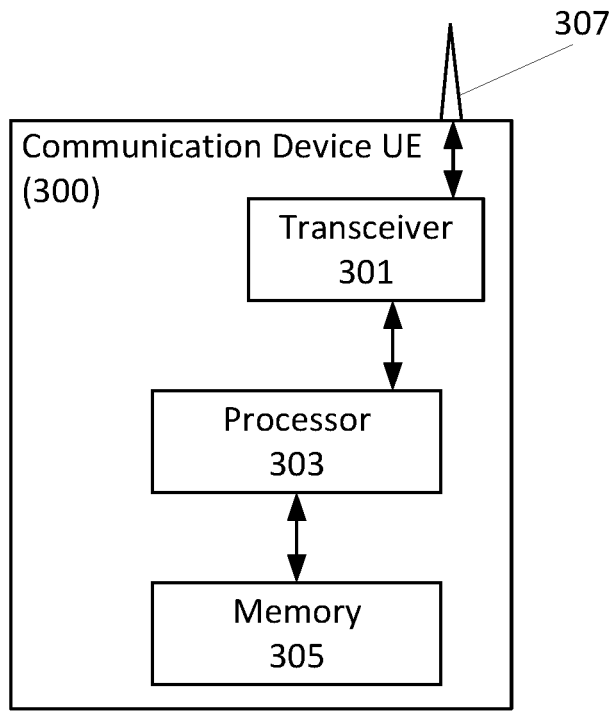
FIG. 7 is a block diagram illustrating a wireless device UE according to some embodiments of inventive concepts.

FIG. 7 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless device 4110 of FIG. 15.) As shown, communication device UE may include an antenna 307 (e.g., corresponding to antenna 4111 of FIG. 15), and transceiver circuitry 301 (also referred to as a transceiver, e.g., corresponding to interface 4114 of FIG. 15) including a transmitter and a receiver configured to provide uplink and downlink radio communications with a base station(s) (e.g., corresponding to network node 4160 of FIG. 15, also referred to as a RAN node) of a radio access network. Communication device UE may also include processing circuitry 303 (also referred to as a processor, e.g., corresponding to processing circuitry 4120 of FIG. 15) coupled to the transceiver circuitry, and memory circuitry 305 (also referred to as memory, e.g., corresponding to device readable medium 4130 of FIG. 15) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

Figure 8:
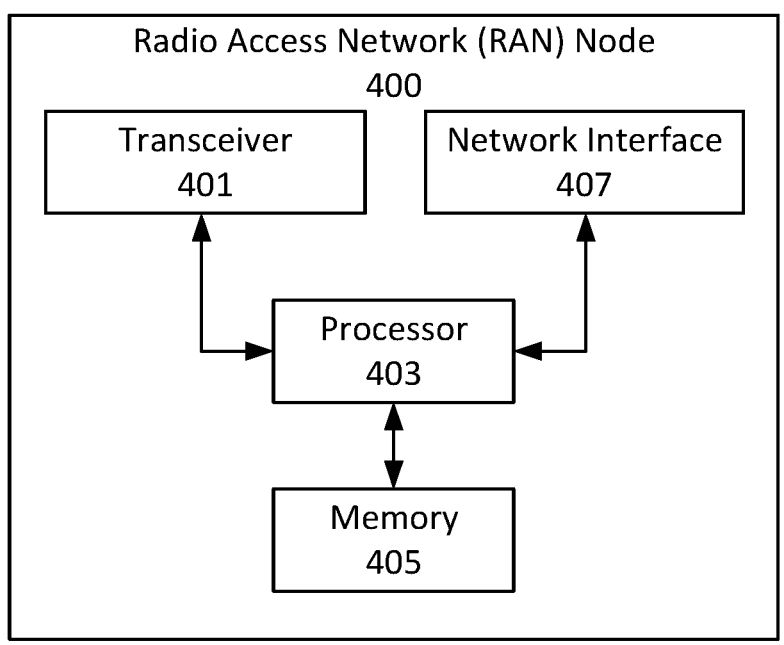
FIG. 8 is a block diagram illustrating a radio access network RAN node (e.g., a base station eNB/gNB) according to some embodiments of inventive concepts.

FIG. 8 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 15.) As shown, the RAN node may include transceiver circuitry 401 (also referred to as a transceiver, e.g., corresponding to portions of interface 4190 of FIG. 15) including a transmitter and a receiver configured to provide uplink and downlink radio communications with mobile terminals. The RAN node may include network interface circuitry 407 (also referred to as a network interface, e.g., corresponding to portions of interface 4190 of FIG. 15) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 15) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 9:
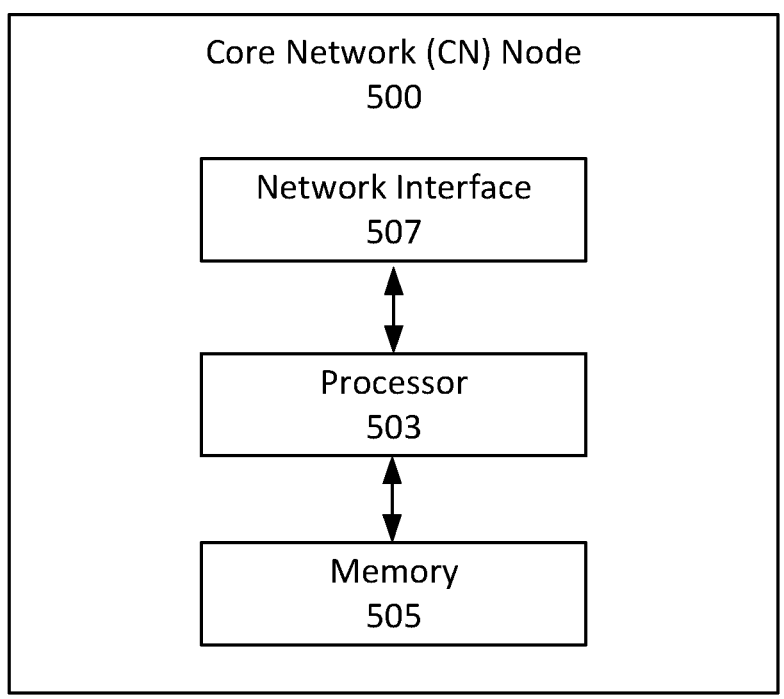
FIG. 9 is a block diagram illustrating a core network CN node (e.g., an AMF node, an SMF node, etc.) according to some embodiments of inventive concepts.

FIG. 9 is a block diagram illustrating elements of a core network CN node (e.g., an SMF node, a UPF node, an AMF node, a PCF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

Network operators (also referred to as Network Service Providers NSP) and ASP/OTT players may be challenged due to the exponential increase of data usage (e.g., video apps like YouTube or Netflix), which may imply costly network expansions. Most of these applications are TCP based (an old protocol which runs at kernel space and consequently may be difficult to update due to the large installed base of legacy devices). From the existing traffic management solutions available at the operator side aiming to improve the user's QoE, potential issues have been identified as discussed below.

Commercial UPFs in general may lack traffic management features specifically targeting Traffic payload improvements/optimizations.

Existing approaches may not be based on getting information from the terminal or application server (OTT) sides (e.g., passing the UE buffer status or the codec selected by UE, or to allow the possibility for the OTT to request a specific buffer in the case of sponsored services).

Existing approaches may not be based on the Core Network CN getting information from the Radio (e.g., passing the eNB buffer status for a certain UE IP-CAN session). Existing approaches in the core network estimate the radio queues in each cell.

Existing approaches may not take into account real time information on exchanged data activity, e.g., to enable the functionality when the target application to be improved/optimized starts and disable it when it stops, to disable the functionality when the target app (application) is running but there is little app traffic (so the improvement/optimization will not be effective), to disable the functionality when there is a higher priority app running (e.g., VoLTE), to take into account UDP traffic for that user, to disable the functionality when the user activates the data-off feature (this implies detection of signaling), etc.

Existing approaches may not take into account dynamic information like location information, access type (e.g., to be enabled for $3^{rd}$ Generation 3G, $4^{th}$ Generation 4G, and $5^{th}$ Generation 5G and disabled for WiFi), congestion info, etc.

According to some embodiments of inventive concepts, AMF may be extended with a new event to expose the handover procedures of a subscriber, and/or UPF may be proposed as a consumer of the above event (i.e., this disclosure also proposes a service based UPF). Improvements/optimizations performed in the Core Network (e.g., in the UPF mainly) may take advantage of this information to perform the right action and/or provide a desired improvement/optimization.

Some embodiments of inventive concepts may allow a network operator (Network Service Provider NSP) to efficiently handle different types of traffic improvement/optimizations that may not be possible with current state of the art approaches. According to some embodiments, the operator may apply a most suitable traffic optimization technique/s to provide required/desired QoS and QoE.

Some embodiments of inventive concepts may improve/optimize usage of network resources according to a required QoS/QoE resulting in lower operator's CAPEX (Capital Expenditure).

Some embodiments of inventive concepts may improve bandwidth efficiency and/or reduce a number of retransmissions which may save on internet resources and/or connection charges.

Some embodiments of inventive concepts may improve the user experience in the way the OTT or network operator estimates more conveniently by reducing, for example, the time to content, especially for high demand services, such as Video Streaming.

Figure 1:
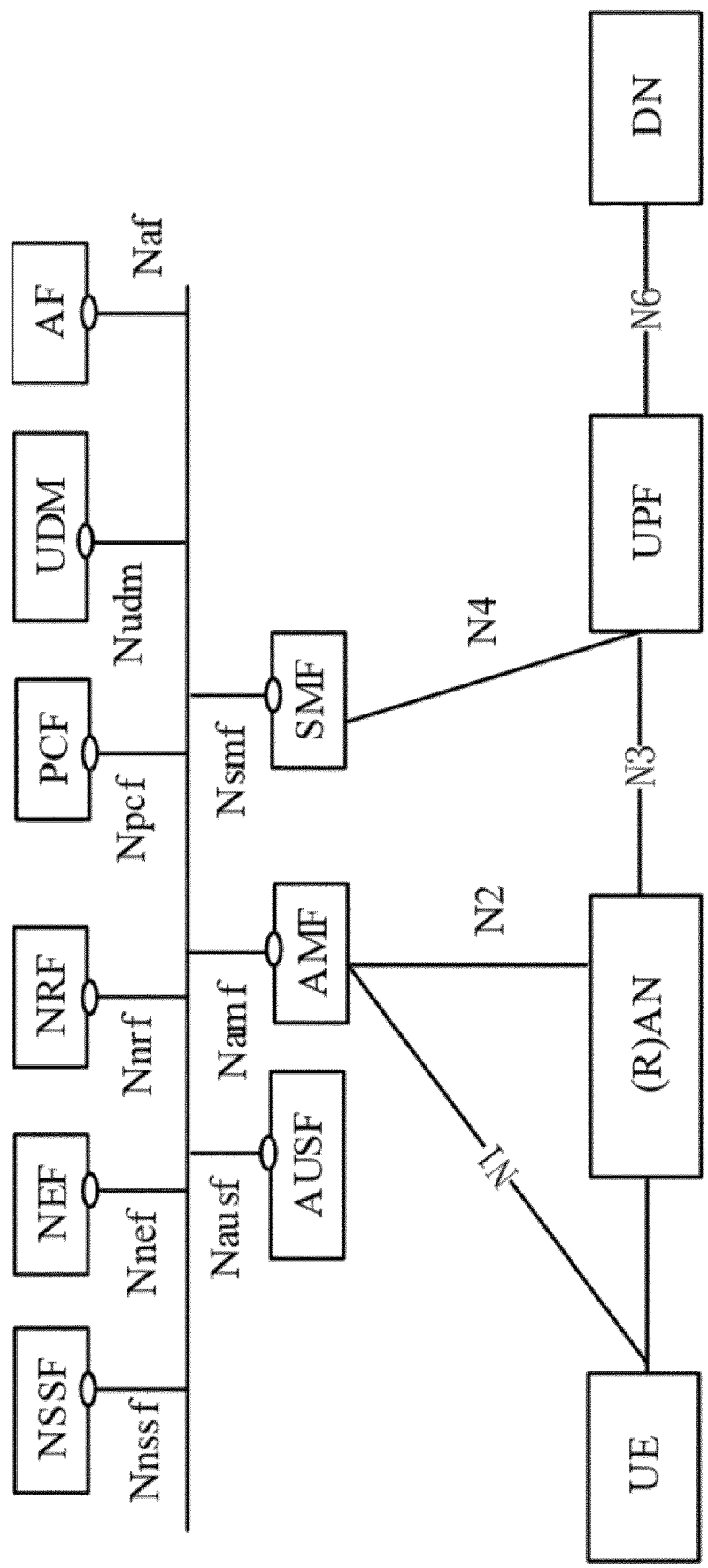
FIG. 1 is block diagram illustrating a 5G reference network architecture.
Figure 2:
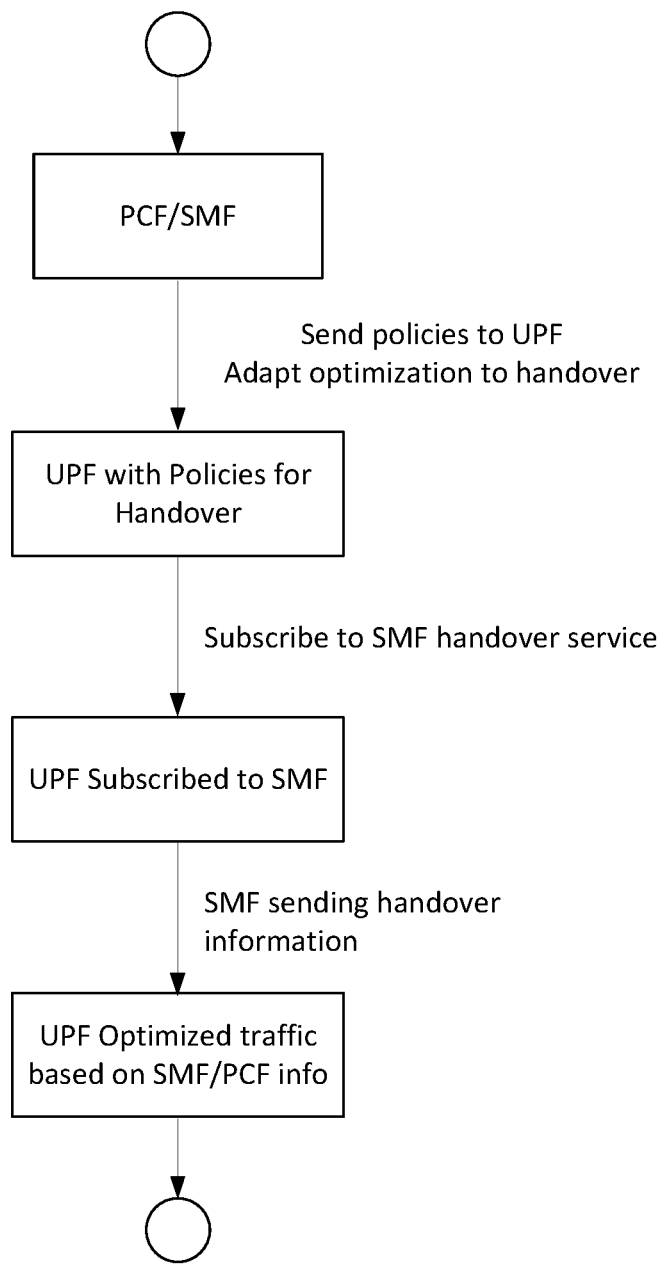
FIG. 2 is a flow chart illustrating operations of a PCF sending improvement/optimization policies towards the UPF using the SMF according to some embodiments of inventive concepts.

FIG. 2 is a flow chart where the PCF sends improvement/optimization policies towards the UPF using the SMF. Once the improvement/optimization policies are received, the UPF may need information about radio events. In this case, the UPF subscribes to the SMF to receive notifications regarding handover events. The SMF will send information about those events to the UPF so that the UPF can apply the corresponding improvements/optimizations based on this information. For example, if the subscriber UE will perform a handover, there is no need to improve/optimize traffic that goes to the older cell. FIG. 2 illustrates/defines operations according to some embodiments of the present disclosure.

As a precondition, an improvement/optimization information storage/retrieval policy may be pre-configured in the Unified Data Repository (UDR, also referred to as Unified Data Repository node or UDR node) as subscriber policy data. This example shows per subscriber policies, but this flow information storage policy can also be applied to a certain application, to a group of subscribers, to a certain slice or globally (e.g., on a per node or network basis). In this disclosure, it may be enriched with the behavior in case handover occurs in a traffic improvement/optimization.

Figure 3A:
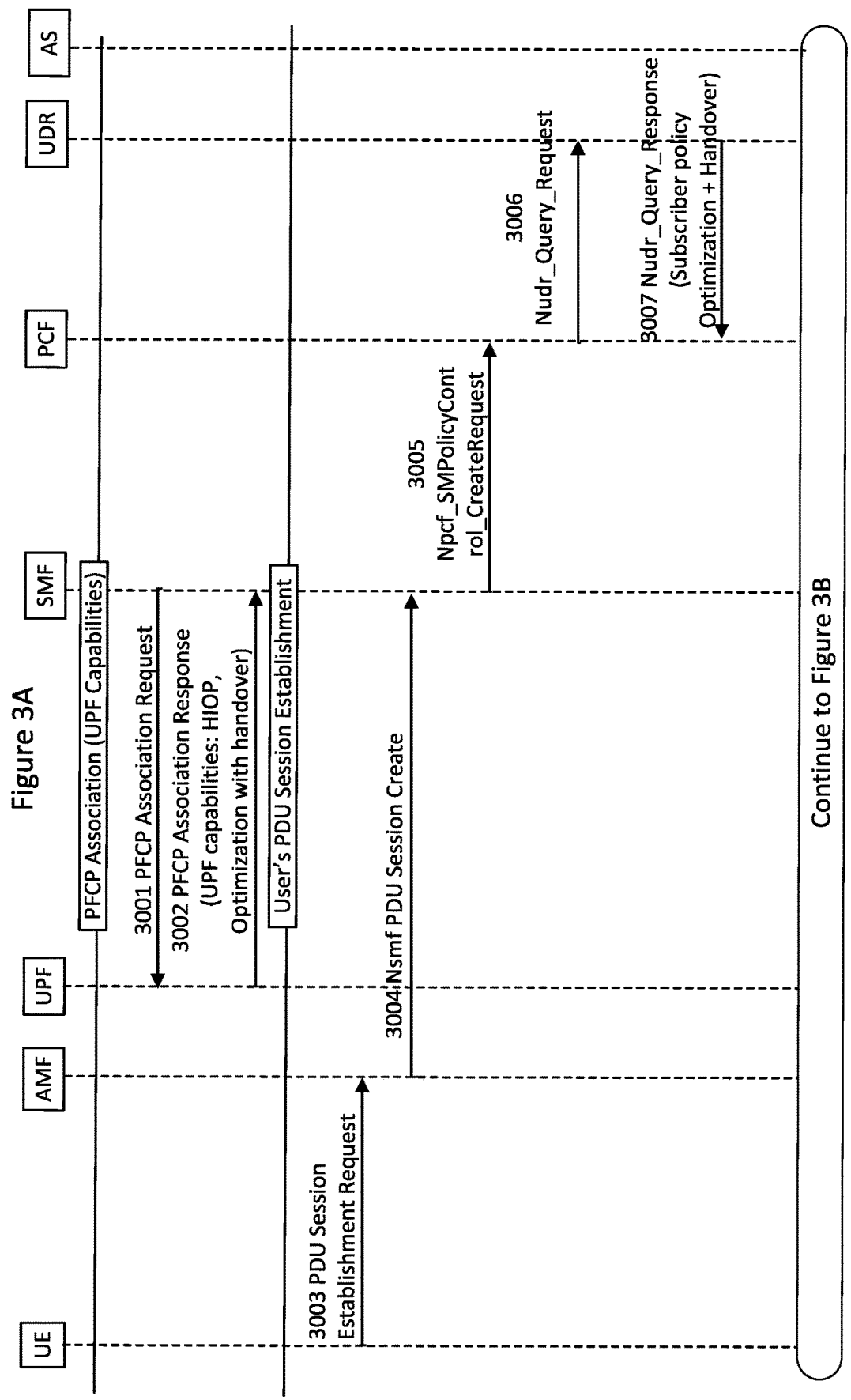

FIGS. 3A, 3B, 3C, 3D, and 3E provide message diagrams illustrating operations according to some embodiments of inventive concepts. In particular, FIGS. 3A, 3B, and 3C illustrate operations that may be the same with respect to the different embodiments of FIG. 3D and FIG. 3E. Stated in other words, operations of some embodiments may be performed using operations of FIGS. 3A, 3B, 3C, and 3D, and operations of some other embodiments may be performed using operations of 3A, 3B, 3C, and 3E.

For operations 3001 and 3002 of FIG. 3A, a PFCP Association procedure is provided between UPF and SMF nodes. As shown at operation 3001, the SMF node transmits a Packet Forwarding Control Protocol PFCP Association request message to the UPF node, and at operation 3002, the UPF node transmits a PFCP association response message to the SMF node in response to receiving the PFCP association request message. According to some embodiments of inventive concepts, existing mechanisms to report UPF capabilities (included in the PFCP association response message of operation 3002) may be extended with a new capability indication, shown in the table of FIGS. 4A and 4B as the Handover information for optimization, HIOP, which indicates whether the UPF node supports optimization with handover (i.e., the UPF node has a capability to receive information regarding handover of a UE and optimize flows for the UE based on the information regarding the handover) or not (i.e., the UPF node does not consider handover of the subscriber). The HIOP field of the PFCP association response message may thus provide a one bit flag having a first value (e.g., "1") to indicate that the UPF supports optimization with handover or a second value (e.g., "2") to indicate that the UPF does not support optimization with handover. The table of FIGS. 4A and 4B illustrates User Plane UP Function Features (including HIOP) that may be communicated in the PFCP association response message of operation 3002.

In operation 3003 of FIG. 3A, the UE triggers a PDU session establishment by sending a Protocol Data Unit PDU Session Establishment Request to the AMF node.

In operation 3004 of FIG. 3A, the AMF node selects an SMF to manage the requested PDU session (e.g., an SMF selection function in the AMF selects an SMF instance based on the available SMF instances obtained from a NRF or on the configured SMF information in the AMF) and triggers transmission of an Nsmf PDU Session Create message. The Nsmf PDU Session Create message is thus transmitted by the AMF node to the selected SMF node responsive to receiving the PDU Session Establishment Request message of operation 3003.

In operation 3005 of FIG. 3A, the SMF node triggers transmission of the Npcf_SMPolicyControl_Create Request message to retrieve SM policies for the user PDU session. The Npcf_SMPolicyControl_Create Request message is thus transmitted by the SMF node to the PCF node responsive to receiving the Nsmf PDU Session Create message of operation 3004.

In operation 3006 of FIG. 3A, the PCF node triggers transmission of the Nudr_Query Request message to the UDR node. The Nudr_Query Request message includes the subscriber identifier ID (an identifier associated with the UE that transmitted the PDU session Establishment Request message of operation 3003, also referred to as a UE ID) to retrieve the policy data for this subscriber's PDU session.

In operation 3007 of FIG. 3A, the UDR answers by transmitting the Nudr_Query Response message including the Subscriber Policy Data (for the UE that transmitted the PDU Session Establishment Request message of operation 3003), and the Subscriber Policy Data includes new Handover information for optimization policies. As an example according to some embodiments of inventive concepts, the new Handover information for optimization policies may be provided using a binary flag as Handover information policies having one of two values: TRUE to indicate Track handover for optimization; or FALSE to indicate NOT consider handover. This value can be extended with more granular information in case it is needed to check handover at other levels such as a Radio Resource Unit (RRU) set of NG-RAN nodes, etc.

In the example of the message diagrams of FIGS. 3A, 3B, 3C, 3D, and/or 3E, it is assumed that optimization will be done at the NG-RAN node. These examples also assume the optimization with handover information policy applies on a per subscriber's PDU session basis. It is also possible to configure different Optimization with Handover information policies for each application.

In operation 3007a of FIG. 3B, the PCF generates the corresponding Policy Control and Charging PCC rule/s based on Subscriber Policy Data (from the Nudr_Query_Response message of operation 3007), and also includes the optimization with handover information (TRUE), which in this example may apply on a per PDU session basis.

In operation 3008, the PCF node transmits the Npcf_SMPolicyControl_CreateResponsePCCRule message to the SMF node, where the Npcf_SMPolicyControl_CreateResponsePCCRule message includes the PCC rule/s and the optimization with handover information for the PDU session.

In operation 3008a of FIG. 3B, the SMF node selects a UPF that supports optimization with handover responsive to the Npcf_SMPolicyControl_CreateResponsePCCRule message of operation 3008 indicating that optimization with handover applies for this PDU session. More particularly, the UPF node may be selected based on the PFCP Association Response message of operation 3002 indicating that optimization with handover is supported by the UPF node.

At operation 3009, the SMF node transmits a PFCP Session Establishment Request message (to trigger a PFCP Session Establishment procedure) towards the selected UPF (i.e., the UPF selected at operation 3008a) to provision the PDRs (and the corresponding enforcement actions: QER Forwarding Action Rules FARs, Usage Reporting Rules URRs, etc.) for the PDU session. Specifically, the SMF node will provision the handover information. In order to do this, the PFCP protocol may be extended by adding a new "Handover Information" IE at "PFCP Session Establishment/Modification Request", as shown in the table provided by FIGS. 5A, 5B, 5C, and 5D. FIGS. 5A, 5B, 5C, and 5D provide a table illustrating creation of a QER IE within a PFCP Session Establishment Request. In particular, the PFCP Session Establishment Request message may include an indication that the UPF node is required to modify its behavior in case of handover for this PDU session.

FIG. 6 is a table illustrating a Flow Information IE that may be used to provide the Handover information for the table provided by FIGS. 5A, 5B, 5C, and 5D. In the example of FIG. 6, Handover Information Profile=TRUE means that the UPF function is required to modify its behavior in case of handover for this PDU session. For the session modification message, there will be similar attributes.

In operation 3010 of FIG. 3B, the UPF node transmits a PFCP Session Establishment Response message to the SMF node (in response to receiving the PFCP Session Establishment Request message of operation 3009).

In operation 3011 of FIG. 3B, the SMF node transmits an Nsmf PDU Session Create Response message to the AMF node as an answer/response to the Nsmf PDU Session Create message of operation 3004 that was received from the AMF node. The Nsmf PDU Session Create Response message may be transmitted in response to receiving the PFCP Session Establishment Response message of operation 3010.

In operation 3012 of FIG. 3B, the AMF node transmits a PDU Session Establishment Response message to the UE to establish a PDU session for the subscriber. The PDU Session Establishment Response message is transmitted as an answer to the PDU Session Establishment Request message of operation 3003, and the PDU Session Establishment Response message may be transmitted by the AMF Node responsive to receiving the Nsmf PDU Session Create Response message. Accordingly, a PDU session may be established for the UE (per the request of operation 3003).

In operation 3012a, the UPF starts providing session traffic for the communication device UE using the PDU session for the communication device responsive to receiving the session establishment request message. For example, the session traffic may be provided by the UPF node between the communication device UE and an application server using the PDU session for the communication device.

In operation 3012b, the UPF starts optimizing end user traffic based on information from the PFCP Session Establishment Request of operation 3009.

In operation 3013 of FIG. 3C, optionally, in case the SMF is not subscribed to handover information, the SMF node subscribes to the AMF node to receive handover information related to the UE. The SMF node is thus able to know of all handovers, but there may be some cases (like insertion of SMF) where the SMF node may not be aware of handovers. More particularly, the SMF node may transmit an Nafm_EventExposure_Subscribe_Request message to the AMF node at operation 3013 to initiate the subscription.

The UPF node thus subscribes to the Namf_EventExposure Service. In this case, a new event is exposed with this service. This new event is the handover between cells performed by an end user UE. The definition of this event is discussed below.

The AMF will provide a new Event to be provided using the Namf_EventExposure Service, where the event is a Handover as discussed below:
   A Network Function NF (in this case the SMF node) subscribes to this event to receive the event report of a UE or group of UEs when the AMF node detects that a target UE has changed the NG-RAN node (or a set of ng-ran nodes), or RRU UE Type: One UE, Group of UEs.
   Report Type: One-Time Report, Continuous Report
   Input: UE ID(s). Optionally: NG-RAN node, or RRU, N3IWF, UE-IP
   Notification; UE-ID, Optionally, updated location (TAI, NCGI for 3GPP access, most recent N3IWF node,)

In operation 3014 of FIG. 3C, the AMF node may transmit an Namf_EventExposure_Subscribe_Response message to the SMF node to confirm that the subscription is correct and has been established (in response to receiving the Nafm_EventExposure_Subscribe_Request message of operation 3013).

Figure 3D:
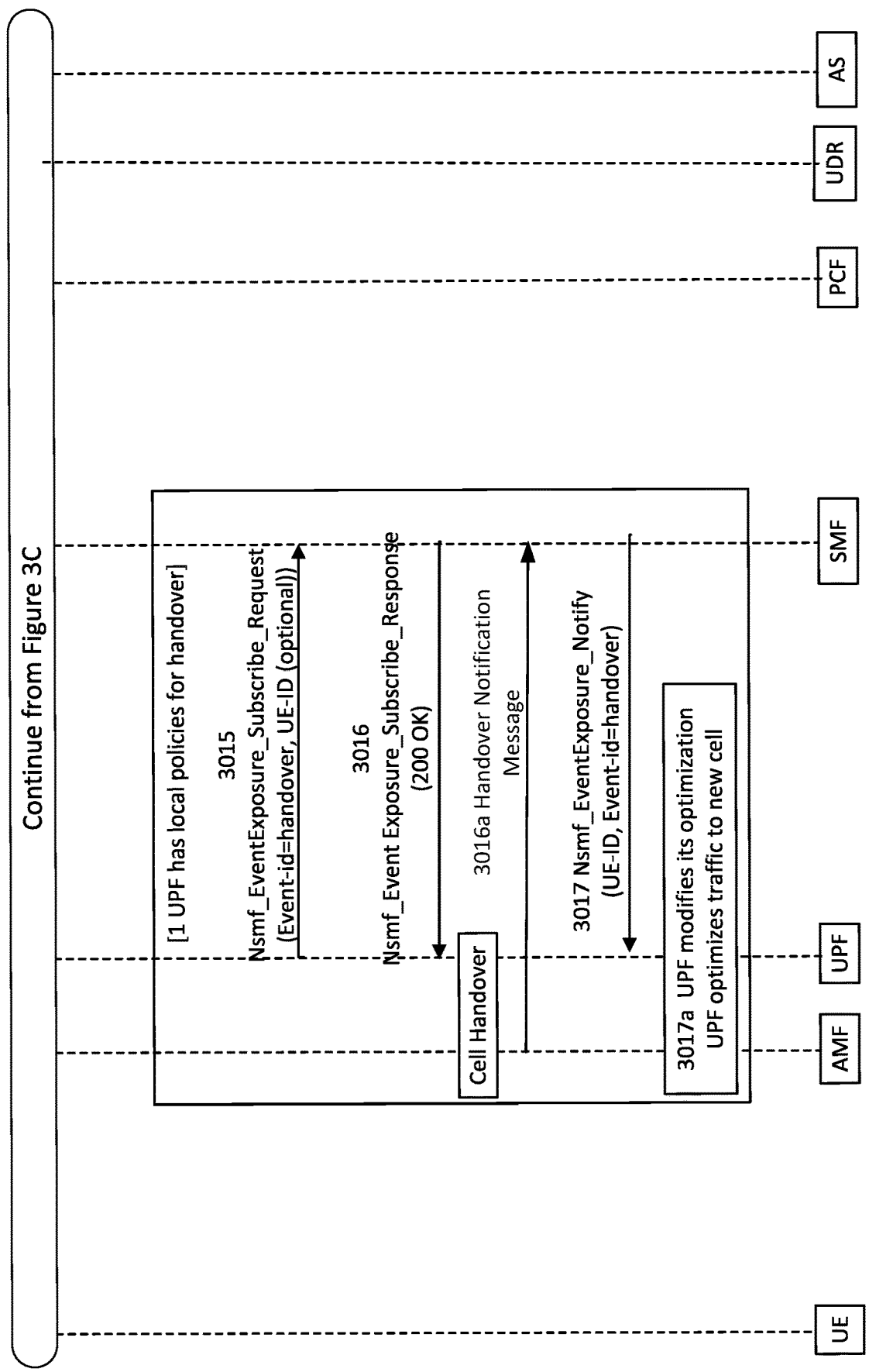

FIGS. 3D and 3E illustrate alternative operations that may be performed to provide optimization of traffic based on a UE handover to a new cell according to different embodiments of inventive concepts. Operations of FIG. 3D may be performed in combination with operations of FIGS. 3A, 3B, and 3C without performing operations of FIG. 3E, and/or operations of FIG. 3E may be performed in combination with operations of 3A, 3B, and 3C without performing operations of FIG. 3D.

Operations 3015, 3016, 3016a, 3017, and 3017a of FIG. 3D may be performed in embodiments where the UPF has local policies to be performed when there is a handover. In operation 3015, the UPF node transmits a Nsmf_EventExposure_Subscribe_Request message (including an identifier of the UE, UE-ID, and the event type, handover) to the SMF node to subscribe to the Nsmf_EventExposure Service with respect to the UE. In this case, a new event is exposed with this service, and this new event is the handover between cells performed by an end user UE. The definition of this event is discussed below where the SMF will provide a new Event (handover) to be provided by Nsmf EventExposure Service. For a Handover event:
   A Network Function NF (the UPF node in this case) subscribes to this event (handover) to receive the event report with respect to a UE or group of UEs when the SMF node detects that a target UE has changed the NG-RAN node (or a set of ng-ran nodes), or RRU, for example, based on notification received from the AMF node (e.g., based on the subscription discussed above with respect to operations 3013 and 3014)
   UE Type: One UE, Group of UEs.
   Report Type: One-Time Report, Continuous Report
   Input: UE ID(s). Optionally: NG-RAN node, or RRU, N3IWF, UE-IP
   Notification; UE-ID, Optionally, updated location (TAI, NCGI for 3GPP access, most recent N3IWF node,)

In operation 3016 of FIG. 3D, the SMF node may transmit an Nsmf_EventExposure_Subscribe_Response message to the UPF node to confirm that the subscription is correct and has been established (in response to receiving the Nsmf_EventExposure_Subscribe_Request message of operation 3015).

As shown in FIG. 3D, cell handover for the UE may occur after operation 3016, and in operation 3016a, the AMF node may transmit a Handover HO notification message to the SMF node responsive to the cell handover. The handover may occur and the HO notification message may be transmitted while providing the session traffic for the communication device using the PDU session. The handover notification message of operation 3016a indicates handover of the communication device UE, and the handover notification message of operation 3016a includes the identifier of the communication device In operation 3017 of FIG. 3D (after cell handover), the SMF node notifies the UPF node using the Nsmf EventExposure Service (i.e., transmitting an Nsmf_EventExposure_Notify message) that the subscriber UE has changed the NG-RAN node (i.e., that handover has occurred). The Nsmf_EventExposure_Notify message may be transmitted by the SMF node to the UPF node at operation 3017 responsive to receiving the handover notification message of operation 3016a.

In operation 3017a, the UPF node uses this information regarding handover to adapt/modify its optimization for this UE to the new handover cell. For example, for TCP and/or QUIC optimization, the UPF may use this information to optimizes traffic due to new buffer occupancy in the new NG-RAN node. The UPF node may also change an RTT (Round Trip Time) based on the new NG-RAN node resulting from the cell handover. The UPF node may also modify the optimization for the UE based on a new buffer and/or new location changes of the NG-RAN node (compared with the previous NG-RAN node, i.e., the NG-RAN node with which the communication device UE was connected before handover).

TCP optimization that is included in the UPF may be used to adjust the TCP signaling of the end-to-end TCP flows to increase/maximize the throughput. The UPF optimizer may take into account the buffer of the NG-RAN node that is currently serving the traffic of the PDU session. The UPF optimizer may buffer and adapt the end user traffic, so that when there is a handover, the UPF optimizer optimizes traffic based on the new cell/NR-RAN node (e.g., adapting for the newer buffer occupancy of the newer NG-RAN node now being used by the UE after handover).

Other optimizations like QUIC optimization (described in EP Provisional Application No. 20382187.1 filed Mar. 12, 2020, entitled "Technique for Implementing Latency Control", also referred to as reference [5]) may also be adapted. In this case, the UPF node measures the RTT of the user UE and takes into account the buffer of the new NG-RAN node. This RTT is going to be modified with new NG-RAN node and with new buffer occupancy in the new NG-RAN node.

As discussed above, operations of FIG. 3E may be performed with operations of FIGS. 3A, 3B, and 3C according to some embodiments, without performing operations of FIG. 3D.

In operation 3018 of FIG. 3E, after operation 3008, not depicted here for clarity, the PCF node can subscribe to the SMF node for notifications regarding handover events in order to provide updated optimization policies for the SMF and/or UPF. As shown, the PCF node transmits an Nsmf_EventExposure_Subscribe_Request message (including the UE-ID and/or the handover event indicator) to the SMF Node. Accordingly, the PCF node subscribes to the Nsmf EventExposure Service. In this case, a new event (Handover) is exposed with this service. It is the handover between cells performed by an end user UE. The definition of this event is discussed below. SMF will provide a new Event (handover) using the Nsmf EventExposure Service. For a Handover event:
    A Network Function NF (the PCF node in this case) subscribes to this event to receive the event report of a UE or group of UEs when SMF detects that a target UE has changed the NG-RAN node (or a set of ng-ran nodes), or RRU, for example, based on notification received from the AMF node (e.g., based on the subscription discussed above with respect to operations 3013 and 3014)
    UE Type: One UE, Group of UEs.
    Report Type: One-Time Report, Continuous Report
    Input: UE ID(s). Optionally: NG-RAN node, or RRU, N3IWF, UE-IP
    Notification; UE-ID, Optionally, updated location (TAI, NCGI for 3GPP access, most recent N3IWF node,)

In operation 3019 of FIG. 3E, the SMF node may transmit an Nsmf_EventExposure_Subscribe_Response message to the UPF node to confirm that the subscription is correct and has been established (in response to receiving the Nsmg_EventExposure_Subscribe_Request message of operation 3018).

As shown in FIG. 3E, cell handover for the UE may occur after operation 3019, and in operation 3019a, the AMF node may transmit a handover HO notification message to the SMF node in response to the cell handover.

In operation 3020 of FIG. 3E (after cell handover), the SMF node notifies the PCF node using the Nsmf_EventExposure Service (i.e., transmitting an Nsmf_EventExposure_Notify message) that the subscriber UE has changed the NG-RAN node responsive to receiving the handover notification message of operation 3019a. Stated in other words, the SMF transmits the Nsmf EventExposure_Notify message to the PCF where the Nsmf EventExposure_Notify message includes the UE identifier and the handover event notification.

In operation 3021 of FIG. 3E, the PCF will update QER (QoS Enforcement Rules) rules regarding optimization towards SMF and transmit the updated QER rules to the SMF node.

In operation 3022 of FIG. 3E, the SMF node will update QER rules regarding optimization towards UPF by transmitting the updated QER rules to the UPF node.

In operation 3023 of FIG. 3E, the UPF node uses this information to adapt/modify its optimization to this UE based on this information regarding the QER rules. The UPF modifies the optimization as discussed below. For TCP and QUIC optimization, for example, the UPF node may use this information to optimizes traffic of the PDU session for the communication device UE due to new buffer occupancy in the new NG-RAN node. There may also be a new RTT (Round Trip Time) changes due to the new NG-RAN node. The UPF node may also modify the optimization for the UE based on a new buffer and/or new location changes of the NG-RAN node (compared with the previous NG-RAN node, i.e., the NG-RAN node with which the communication device UE was connected before handover).

TCP optimization that is included in the UPF may be used to adjust the TCP signaling of the end-to-end TCP flows to increase/maximize the throughput. The UPF optimizer may take into account the buffer of the NG-RAN node that is currently serving the traffic of the PDU session. The UPF optimizer may buffer and adapt the end user traffic, so that when there is a handover, the UPF optimizer optimizes traffic based on the new cell/NR-RAN node (e.g., adapting for the newer buffer occupancy of the newer NG-RAN node now being used by the UE after handover).

Other optimization like QUIC optimization (described in EP Provisional Application No. 20382187.1 filed Mar. 12, 2020, entitled "Technique for Implementing Latency Control", also referred to as Reference [5]) may also be adapted. In this case, the UPF node measures the RTT of the user UE and takes into account the buffer of NG-RAN node. This RTT is going to be modified with new NG-RAN node and with new buffer occupancy in the new NG-RAN node.

Some embodiments of inventive concepts may thus define approaches that extend the Event Exposure of AMF to provide handover events in UPF traffic improvement/optimization scenarios.

Operations of a Session Management Function SMF node (implemented using the Core Network node 500 structure of FIG. 9) will now be discussed with reference to the flow chart of FIG. 10 according to some embodiments of inventive concepts corresponding to embodiments discussed above with respect to FIGS. 3A, 3B, 3C, and 3D. For example, modules may be stored in memory 505 of FIG. 9, and these modules may provide instructions so that when the instructions of a module are executed by processing circuitry 503, processing circuitry 503 performs respective operations of the flow chart.

According to some embodiments at block 10001, processing circuitry 503 transmits (through network interface 507) an association request message to a user plane function UPF node of a core network CN. Operations of block 10001 may be performed as discussed above with respect to operation 3001 of FIG. 3A.

According to some embodiment at block 10002, processing circuitry 503 receives (through network interface 507) an association response message from the UPF node of the CN, wherein the association response message is responsive to the association request message. The association message includes an indication that the UPF node supports a capability to modify session traffic in response to a handover.

Operation of block 10002 may be performed as discussed above with respect to operation 3002 of FIG. 3A.

According to some embodiment at block 10004, processing circuitry 503 receives (through network interface 507) a protocol data unit PDU session create request message requesting creation of a PDU session for a communication device. Operation of block 10004 may be performed as discussed above with respect to operation 3004 of FIG. 3A. According to some embodiments, the PDU session create request message is received (through network interface 507) by the processing circuitry 503 from an access and mobility management function AMF node.

According to some embodiment at block 10005, processing circuitry 503 transmits (through network interface 507) a policy control create request message responsive to receiving the PDU session create request message requesting creation of the PDU session for the communication device. Operation of block 10005 may be performed as discussed above with respect to operation 3005 of FIG. 3A.

According to some embodiment at block 10008, processing circuitry 503 receives (through network interface 507) a policy control create response message after transmitting the policy control create request message. The policy control create response message is in response to the policy control create request message. The policy control create response message includes an indication that session traffic of the PDU session for the communication device is to be modified in response to handover. Operation of block 10008 may be performed as discussed above with respect to operation 3008 of FIG. 3B.

According to some embodiment at block 10008a, processing circuitry 503 selects the UPF node to handle the PDU session for the communication device responsive to the indication that the UPF node supports the capability to modify session traffic in response to handover and responsive to the indication that session traffic of the PDU session for the communication device is to be modified in response to handover. Operation of block 10008a may be performed as discussed above with respect to operation 3008a of FIG. 3B.

According to some embodiment at block 10009, processing circuitry 503 transmits (through network interface 507) a session establishment request message to the UPF node responsive to selecting the UPF node to handle the PDU session for the communication device. The session establishment request message includes an indication to modify session traffic of the PDU session for the communication device in response to handover. Operation of block 10009 may be performed as discussed above with respect to operation 3009 of FIG. 3B.

According to some embodiment at block 10010, processing circuitry 503 receives (through network interface 507) a session establishment response message from the UPF node before transmitting the PDU session create response message. The session establishment response message is responsive to the session establishment request message. Operation of block 10010 may be performed as discussed above with respect to operation 3010 of FIG. 3B.

According to some embodiments at block 10011, the processing circuitry 503 transmits (through network interface 507) a PDU session create response message (to the AFM node from which the PDU session create request message of block 1004 was received) responsive to the PDU session create request message and responsive to receiving the session establishment response message. The PDU session create response message is transmitted after transmitting the session establishment request message. Operation of block 10011 may be performed as discussed above with respect to operation 3011 of FIG. 3B.

At block 10013, the processing circuitry 503 transmits (through network interface 507) a first handover subscribe request message to the AMF node. The first handover subscribe request message includes the identifier of the communication device. Operation of block 10013 may be performed as discussed above with respect to operation 3013 of FIG. 3C.

According to some embodiments at block 10014, processing circuitry 503 receives (through network interface 507) a handover HO subscribe response message from the AMF node, where the HO subscribe response message is in response to the handover subscribe request message. Operation of block 10014 may be performed as discussed above with respect to operation 3014 of FIG. 3C.

According to some embodiments at block 10015, the processing circuitry 503 receives (through network interface 507) a second handover subscribe request message including the identifier of the communication device. The second handover subscribe request message is received from the UPF node. Operation of block 10015 may be performed as discussed above with respect to operation 3015 of FIG. 3D.

According to some embodiments at block 10016, processing circuitry 503 transmits (through network interface 507) a second Handover HO subscribe response message that is transmitted in response to receiving the second HO subscribe request message of block 10015. Operation of block 10016 may be performed as discussed above with respect to operation 3016 of FIG. 3D.

According to some embodiments at block 10016a, the processing circuitry 503 receives (through network interface 507) a first handover event notification message from the AMF node after transmitting the handover subscribe request message. The first handover event notification message indicates handover of the communication device, and the first handover event notification message includes the identifier of the communication device. Operation of block 10016a may be performed as discussed above with respect to operation 3016a of FIG. 3D.

According to some embodiment at block 10017, processing circuitry 503 transmits (through network interface 507) a second handover event notification message to the UPF node responsive to handover of the communication device. The second handover notification message includes an identifier of the communication device. Operation of block 10017 may be performed as discussed above with respect to operation 3017 of FIG. 3D. The second handover event notification message may be transmitted to the UPF node responsive to receiving the first handover event notification message from the AMF node and responsive to receiving the second handover subscribe request message from the UPF node.

According to some embodiments, the policy control create request message of block 10005 is transmitted to a policy control function PCF node of the CN, and the policy control create response message of block 10008 is received from the PCF node of the CN.

Figure 10:
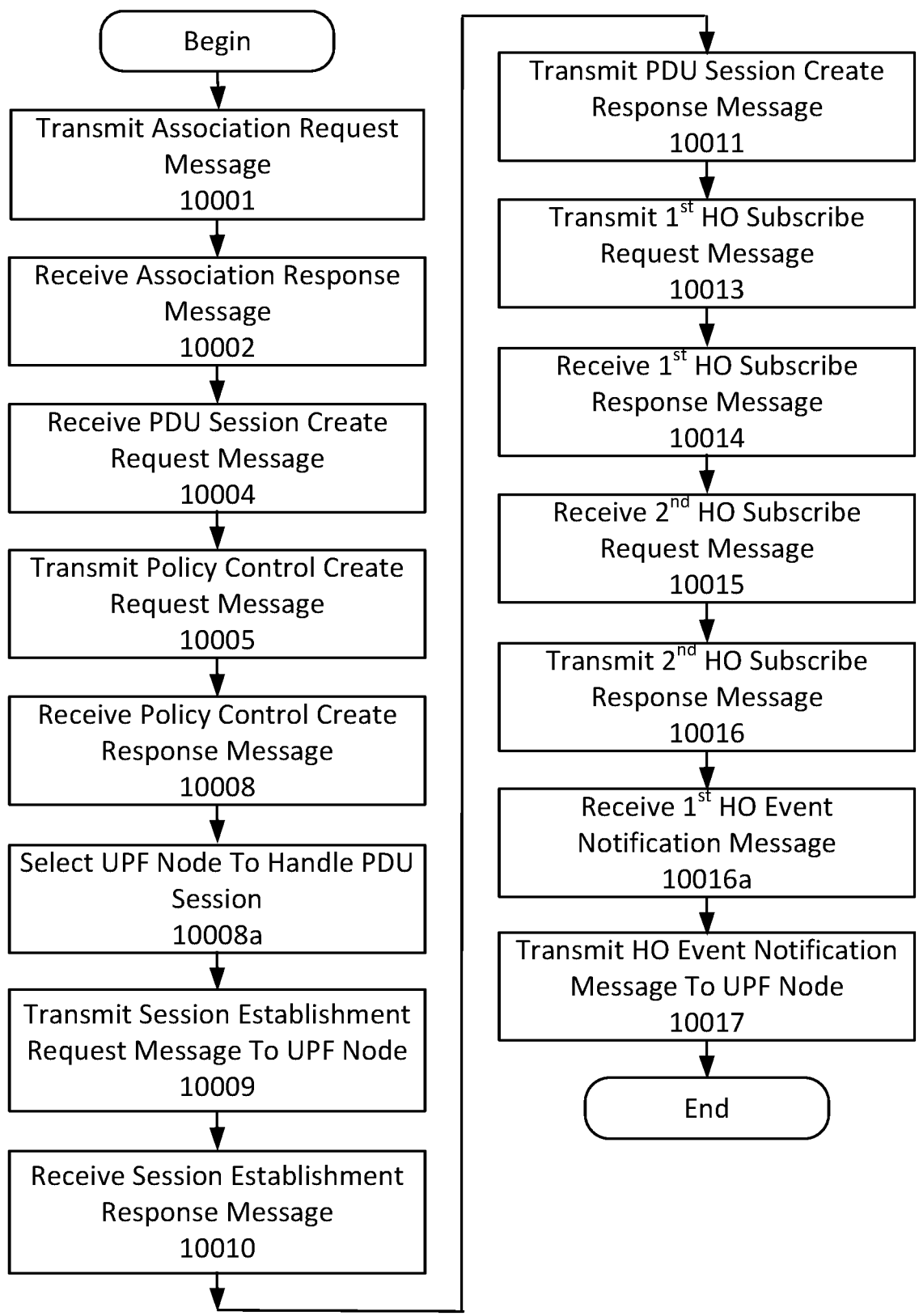
FIGS. 10 and 11 are flow charts illustrating operations of a session management function SMF node according to some embodiments of inventive concepts.

Various operations from the flow chart of FIG. 10 may be optional with respect to some embodiments of SMF nodes and related methods. Regarding methods of some embodiments, for example, operations of blocks 10001, 10010, 10011, 10013, 10014, 10015, 10016, 10016a, and/or 10017 of FIG. 10 may be optional.

Operations of a Session Management Function SMF node (implemented using the Core Network node 500 structure of FIG. 9) will now be discussed with reference to the flow chart of FIG. 11 according to some embodiments of inventive concepts corresponding to embodiments discussed above with respect to FIGS. 3A, 3B, 3C, and 3E. For example, modules may be stored in memory 505 of FIG. 9, and these modules may provide instructions so that when the instructions of a module are executed by processing circuitry 503, processing circuitry 503 performs respective operations of the flow chart.

According to some embodiments, processing circuitry 503 may perform operations of blocks 10001, 10002, 10004, 10005, 10008, 10008a, 10009, 10010, 10011, 10013, and 10014 as discussed above with respect to FIG. 10. Further discussion of these blocks will thus be omitted for the sake of conciseness.

According to some embodiments at block 11018, the processing circuitry 503 receives (though network interface 507) a second handover subscribe request message including the identifier of the communication device. The second handover subscribe request message is received from the PCF node. Operation of block 11018 may be performed as discussed above with respect to operation 3018 of FIG. 3E.

According to some embodiments at block 11019, processing circuitry 503 transmits (through network interface 507) a second handover HO subscribe response message to the PCF node responsive to receiving the second HO subscribe request message of block 11018. Operation of block 11019 may be performed as discussed above with respect to operation 3019 of FIG. 3E.

According to some embodiments at block 11019a, the processing circuitry 503 receives (through network interface 507) a first handover event notification message from the AMF node after transmitting the handover subscribe request message. The first handover event notification message indicates handover of the communication device, and the first handover event notification message includes the identifier of the communication device. Operation of block 11019a may be performed as discussed above with respect to operation 3019a of FIG. 3E.

According to some embodiments at block 11020, the processing circuitry 503 transmits (through network interface 507) a second handover event notification message to the policy control function PCF node. The second handover event notification message indicates handover of the communication device, and the second handover event notification message includes the identifier of the communication device. The second handover event notification message may be transmitted to the PCF node responsive to receiving the first handover notification message from the AMF node and/or responsive to receiving the second handover subscribe request message from the PCF node. Operation of block 11020 may be performed as discussed above with respect to operation 3020 of FIG. 3E.

According to some embodiments at block 11021, the processing circuitry 503 receives (through network interface 507) a first QER message from the PCF node after transmitting the second handover event notification message to the PCF node. Operation of block 11021 may be performed as discussed above with respect to operation 3021 of FIG. 3E.

According to some embodiments at block 11022, the processing circuitry 503 transmits (through network interface 507) a second QER message to the UPF node responsive to handover of the communication device and/or responsive to receiving the first QER message from the PCF node. The second QER message includes an identifier of the communication device. Operation of block 11022 may be performed as discussed above with respect to operation 3022 of FIG. 3E.

Figure 11:
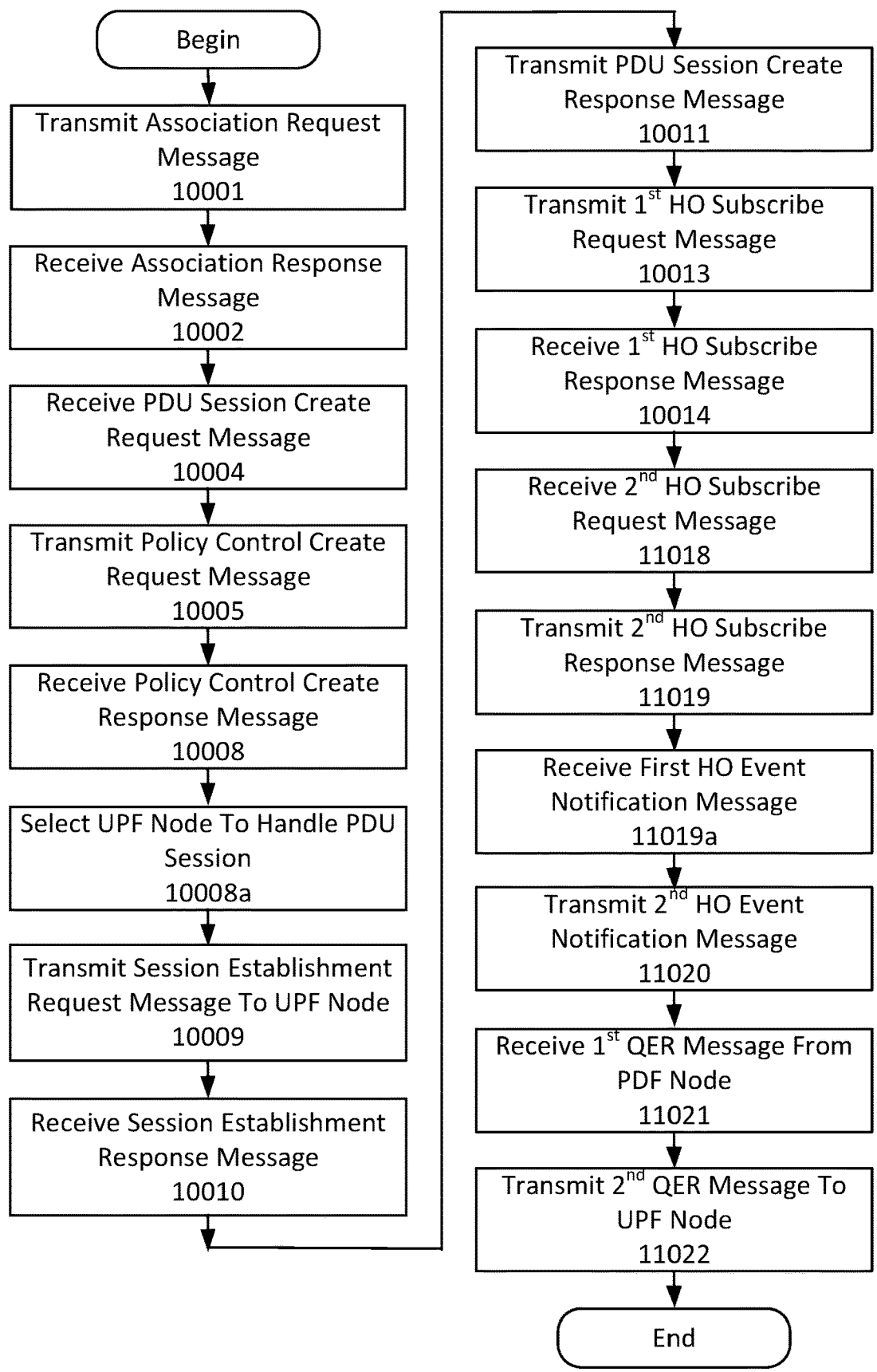

Various operations from the flow chart of FIG. 11 may be optional with respect to some embodiments of SMF nodes and related methods. Regarding methods of some embodiments, for example, operations of blocks 10001, 10010, 10011, 10013, 10014, 10018, 10019, 10019a, 11020, 11021, and/or 11022 of FIG. 11 may be optional.

Operations of a User Plane Function UPF node (implemented using the Core Network node 500 structure of FIG. 9) will now be discussed with reference to the flow chart of FIG. 12 according to some embodiments of inventive concepts corresponding to embodiments discussed above with respect to FIGS. 3A, 3B, 3C, and 3D. For example, modules may be stored in memory 505 of FIG. 9, and these modules may provide instructions so that when the instructions of a module are executed by processing circuitry 503, processing circuitry 503 performs respective operations of the flow chart.

According to some embodiments at block 12001, the processing circuitry 503 receives (through network interface 507) an association request message from the SMF node. Operation of block 12001 may be performed as discussed above with respect to operation 3001 of FIG. 3A.

According to some embodiments at block 12002, the processing circuitry 503 transmits (through network interface 507) an association response message to a session management function SMF node of the CN responsive to receiving the association request message. The association response message includes an indication that the UPF node supports a capability to modify session traffic in response to a handover. Operation of block 12002 may be performed as discussed above with respect to operation 3002 of FIG. 3A.

According to some embodiments at block 12009, the processing circuitry 503 receives (through network interface 507) a session establishment request message from the SMF node. The session establishment request message includes an indication to modify session traffic of the PDU session for the communication device in response to handover. Operation of block 12009 may be performed as discussed above with respect to operation 3009 of FIG. 3B.

According to some embodiments at block 12010, the processing circuitry 503 transmits (through network interface 507) a session establishment response message to the SMF node responsive to receiving the session establishment request message. Operation of block 12010 may be performed as discussed above with respect to operation 3010 of FIG. 3B.

According to some embodiments at block 12012a, the processing circuitry 503 provides (through network interface 507) session traffic for the communication device using the PDU session for the communication device responsive to receiving the session establishment request message. Operation of block 12012a may be performed as discussed above with respect to operation 3012a of FIG. 3B. According to some embodiments, the session traffic of block 12012a is provided by the UPF node between the communication device and an application server using the PDU session for the communication device. Moreover, processing circuitry 503 may continue providing the session traffic for the communication device using the PDU session while performing operations of blocks 12012b, 12015, 12016, 12017, and/or 12017a of FIG. 12.

According to some embodiments at block 12012b, the processing circuitry 503 starts optimizing end user session traffic for the PDU session. Operation of block 12012b may be performed as discussed above with respect to operation 3012b of FIG. 3B.

According to some embodiments at block 12015, the processing circuitry 503 transmits (through network interface 507) a handover subscribe request message including the identifier of the communication device. The handover subscribe request message is transmitted to the SMF node. Operation of block 12015 may be performed as discussed above with respect to operation 3015 of FIG. 3D.

According to some embodiments at block 12016, processing circuitry 503 receives a handover subscribe response message that is in response to the handover subscribe request message of block 12015. Operation of block 12016 may be performed as discussed above with respect to operation 3016 of FIG. 3D.

According to some embodiments at block 12017, the processing circuitry 503 receives (though network interface 507) a handover event notification message from the SMF (after transmitting the handover subscribe request message) while providing the session traffic for the communication device using the PDU session. The handover event notification message includes an identifier of the communication device. Operation of block 12017 may be performed as discussed above with respect to operation 3017 of FIG. 3D.

According to some embodiments at block 12017a, the processing circuitry 503 modifies provision of the session traffic for the communication device using the PDU session with a new handover cell responsive to receiving the handover event notification message. Operation of block 12017a may be performed as discussed above with respect to operation 3017a of FIG. 3D. According to some embodiments, modifying provision of the session traffic may include at least one of modifying a bit rate, window size, and/or buffer allocation used for the session traffic. According to some embodiments, modifying provisions of the session traffic may include modifying an optimization used for provision of the session traffic for the communication device using the PDU session with the new handover cell.

Figure 12:
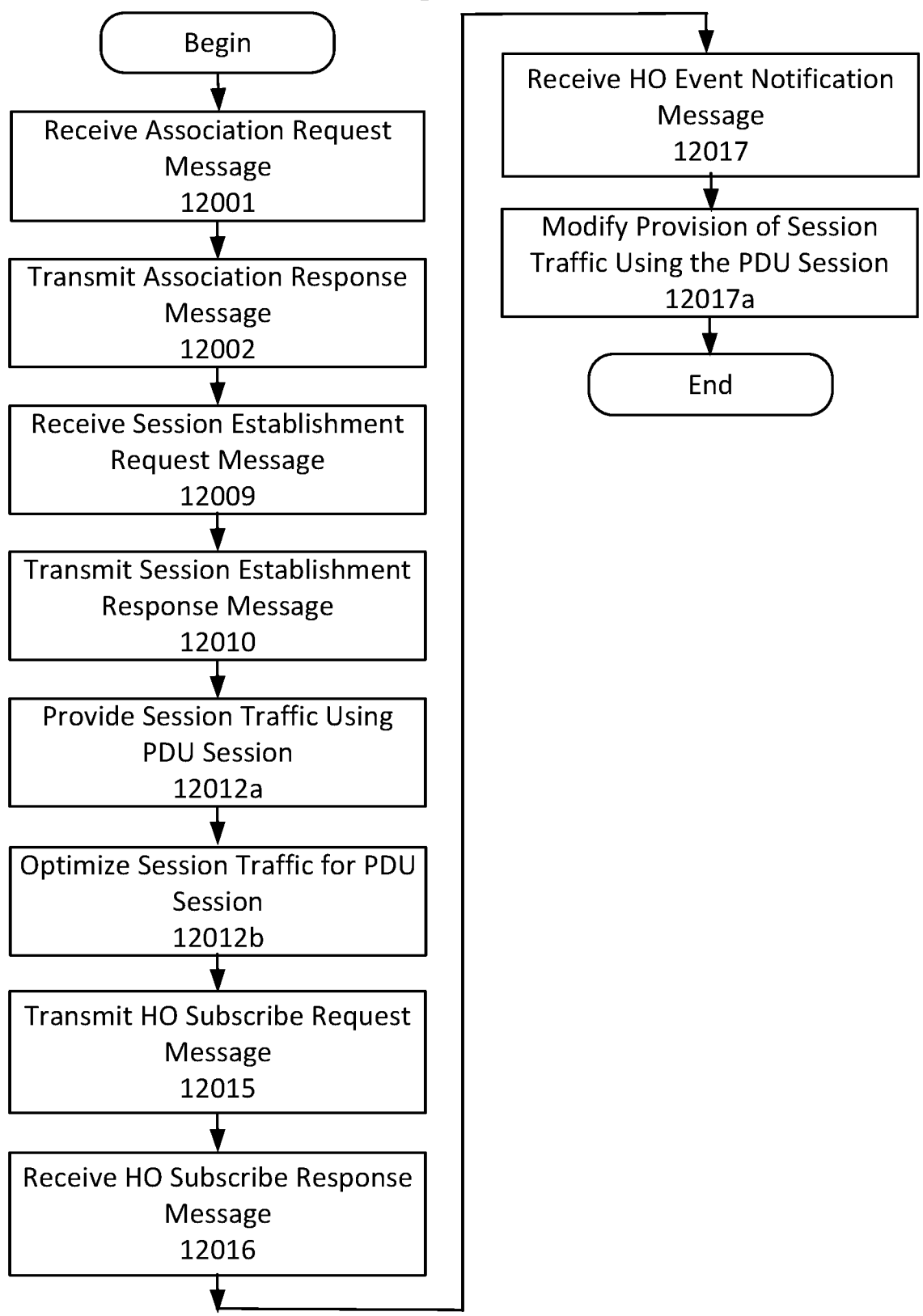
FIGS. 12 and 13 are flow charts illustrating operations of a user plane function UPF node according to some embodiments of inventive concepts.

Various operations from the flow chart of FIG. 12 may be optional with respect to some embodiments of UPF nodes and related methods. Regarding methods of some embodiments, for example, operations of blocks 12001, 12010, 12012a, 12015, 12016, 12017, and/or 12017a of FIG. 12 may be optional.

Operations of a User Plane Function UPF node (implemented using the Core Network node 500 structure of FIG. 9) will now be discussed with reference to the flow chart of FIG. 13 according to some embodiments of inventive concepts corresponding to embodiments discussed above with respect to FIGS. 3A, 3B, 3C, and 3E. For example, modules may be stored in memory 505 of FIG. 9, and these modules may provide instructions so that when the instructions of a module are executed by processing circuitry 503, processing circuitry 503 performs respective operations of the flow chart.

According to some embodiments, processing circuitry 503 may perform operations of blocks 12001, 12002, 12009, 12010, 12012a, and 12012b as discussed above with respect to FIG. 12. Further discussion of these blocks will thus be omitted for the sake of conciseness. Moreover, processing circuitry 503 may continue providing the session traffic for the communication device using the PDU session while performing operations of blocks 12012b, 13022, and/or 13023 of FIG. 13.

According to some embodiments at block 13022, the processing circuitry 503 receives (through network interface 507) a quality of service enforcement rule QER message from the SMF node while providing the session traffic for the communication device using the PDU session. The QER message includes an identifier of the communication device. Operation of block 13022 may be performed as discussed above with respect to operation 3022 of FIG. 3E.

According to some embodiments at block 13022, the processing circuitry 503 modifies provision of the session traffic for the communication device using the PDU session with a new handover cell responsive to receiving the QER message. According to some embodiments, the modifying provision of the session traffic may include at least one of modifying a bit rate, window size, and/or buffer allocation used for the session traffic. According to some embodiments, modifying provisions of the session traffic may include modifying an optimization used for provision of the session traffic for the communication device using the PDU session with the new handover cell.

According to some embodiments, the QER message of block 13022 includes an indication defining a bit rate for the session traffic for the communication device using the PDU session, and modifying provision of the session traffic at block 13023 may include modifying provision of the session traffic based on the bit rate.

Figure 13:
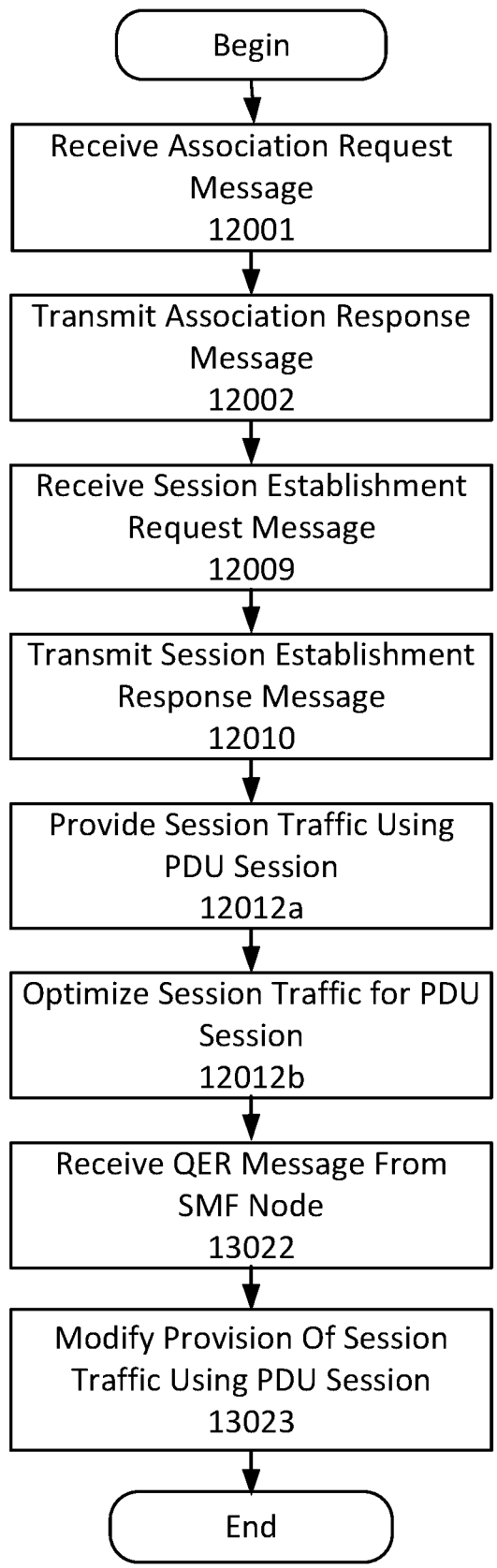

Various operations from the flow chart of FIG. 13 may be optional with respect to some embodiments of UPF nodes and related methods. Regarding methods of some embodiments, for example, operations of blocks 12001, 12010, 12012a, 13022, and/or 13023 of FIG. 13 may be optional.

Operations of a Policy Control Function PCF node (implemented using the Core Network node 500 structure of FIG. 9) will now be discussed with reference to the flow chart of FIG. 14 according to some embodiments of inventive concepts corresponding to embodiments discussed above with respect to FIGS. 3A, 3B, 3C, and 3E. For example, modules may be stored in memory 505 of FIG. 9, and these modules may provide instructions so that when the instructions of a module are executed by processing circuitry 503, processing circuitry 503 performs respective operations of the flow chart.

According to some embodiments at block 14005, the processing circuitry 503 receives (through network interface 507) a policy control create request message for a PDU session for a communication device. The policy control create request message is received from a session management function SMF node. Operation of block 14005 may be performed as discussed above with respect to operation 3005 of FIG. 3A.

According to some embodiments at block 14006, the processing circuitry 503 transmits (through network interface 507) a query request to a Unified Data Repository UDR node responsive to receiving the policy control create request message for the PDU session for the communication device. Operation of block 14006 may be performed as discussed above with respect to operation 3006 of FIG. 3A.

According to some embodiments at block 14007, the processing circuitry 503 receives (through network interface 507) a query response from the UDR node for the PDU session for the communication device after transmitting the query request. The query response includes policy subscriber information for the communication device. Operation of block 14007 may be performed as discussed above with respect to operation 3007 of FIG. 3A.

According to some embodiments at block 14008, the processing circuitry 503 transmits (through network interface 507) a policy control create response message responsive to the policy control create request message. The policy control create response message includes an indication that session traffic of the PDU session for the communication device is to be modified in response to handover, and the policy control create response message is transmitted to the SMF node, for example. Operation of block 14008 may be performed as discussed above with respect to operation 3008 of FIG. 3B.

According to some embodiments, the policy control create response message includes the indication that session traffic of the PDU session is to be modified in response to handover based on the policy subscriber information from the query response.

According to some embodiments at block 14018, the processing circuitry 503 transmits (through network interface 507) a handover subscribe request message including the identifier of the communication device. The handover subscribe request message is transmitted to the SMF node. Operation of block 14018 may be performed as discussed above with respect to operation 3018 of FIG. 3E.

According to some embodiments at block 14019, the processing circuitry 503 receives a handover subscribe response message that is responsive to the handover subscribe request message of operation 14018. Operation of block 14019 may be performed as discussed above with respect to operation 3019 of FIG. 3E.

According to some embodiments at block 14020, the processing circuitry 503 receives (through network interface 507) a handover event notification message from the SMF node. The handover event notification message indicates handover of the communication device, and the handover event notification message includes the identifier of the communication device. Operation of block 14020 may be performed as discussed above with respect to operation 3020 of FIG. 3E.

According to some embodiments at block 14021, the processing circuitry 503 transmits (through network interface 507) a quality of service enforcement rule QER message to the SMF node responsive to handover of the communication device. The QER message includes an identifier of the communication device. Operation of block 14021 may be performed as discussed above with respect to operation 3021 of FIG. 3E. According to some embodiments, the QER message is transmitted to the SMF node responsive to receiving the handover event notification message from the SMF node at block 14020.

Figure 14:
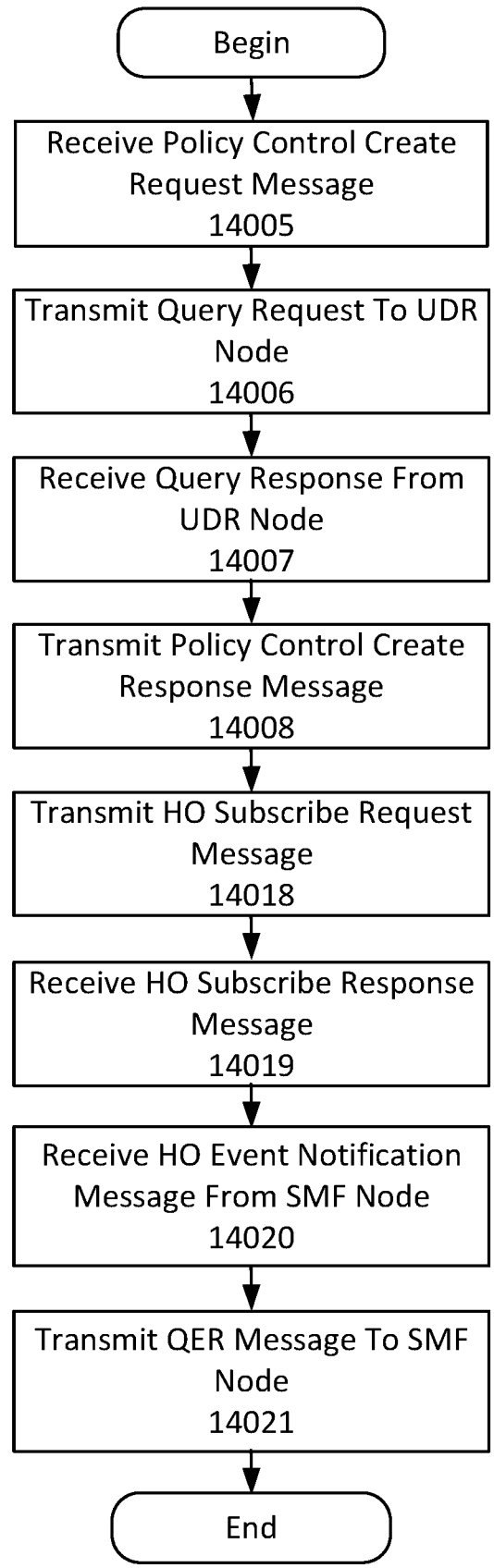
FIG. 14 is a flow chart illustrating operations of a policy control function PCF node according to some embodiments of inventive concepts.

Various operations from the flow chart of FIG. 14 may be optional with respect to some embodiments of UPF nodes and related methods. Regarding methods of some embodiments, for example, operations of blocks 14006, 14007, 14018, 14019, 14020, and/or 14021 of FIG. 14 may be optional.

Explanations are provided below for various abbreviations/acronyms used in the present disclosure.

Abbreviation Explanation 5G 5<sup>th</sup> Generation
ACK Acknowledgement
AF Application Function
AMF Access and Mobility Management Function
AQM Advanced Queue Management
AR Augmented Reality
ASP Application Service Provider
BBR Bottleneck Bandwidth Round-trip
CN Core Network
CUPS Control and User Plane Separation
DN Domain Name or Domain Network
DNS Domain Name Server
eNB evolved Node B
FAR Forwarding Action Rule
HIOP Handover Information For Optimization
IE Information Element
IETF Internet Engineering Task Force
IP Internet Protocol
IP-CAN IP Connectivity Access Network
LTE Long Term Evolution
ML Machine Learning
NCGI NR Cell Global Identifier
NEF Network Exposure Function
NF Network Function
NG Next Generation
NR Next Generation Radio/New Radio
NRF Network Repository Function
NSP Network Service Provider
NSSF Network Slice Selection Function
NWDAF Network Data Analytics Function
OAM Operations, Administration and Maintenance
OTT Over The Top
PCC Policy Control and Charging
PCF Policy Control Function
PDU Protocol Data Unit
PFCP Packet Forwarding Control Protocol
QoE Quality of Experience
QoS Quality of Service
QUIC Quick UDP Internet Connections
PFD Packet Flow Description
QER QoS Enforcement Rules
QoE Quality of Experience
QoS Quality of Service
RAN Radio Access Node
RRU Radio Resource Unit
RTT Round Trip Time
SMF Session Management Function
TAI Tracking Area Identity
TCP Transmission Control Protocol
UE User Equipment
UDM Unified Data Management
UDR Unified Data Repository
UPF User Plane Function
URR Usage Reporting Rule
VoLTE Voice over LTE
gNB: node providing NR user plane and control plane protocol terminations towards the UE, and connected via the NG interface to the 5GC.
ng-eNB: node providing E-UTRA user plane and control plane protocol terminations towards the UE, and connected via the NG interface to the 5GC NG-RAN node: either a gNB or an ng-eNB.

References are Identified Below

[1] 3GPP TS 29.244 v16.1.0 (September 2019): Interface between the Control Plane and the User Plane nodes
[2] 3GPP TS 29.518 V16.3.0 (March 2020): Group Core Network and Terminals; 5G System; Access and Mobility Management Services; Stage 3 (Release 16)
[3] 3GPP TS 23.288 V16.3.0 (March 2020): Group Services and System Aspects; Architecture enhancements for 5G System (5GS) to support network data analytics services (Release 16)
[4] 3GPP TS 23.501 V16.4.0 (2020-03): Group Services and System Aspects; System architecture for the 5G System (5GS); Stage 2 (Release 16)

[5] EP Provisional Application No. 20382187.1, filed March 12, 2020, entitled "Technique for Implementing Latency Control"

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 15:
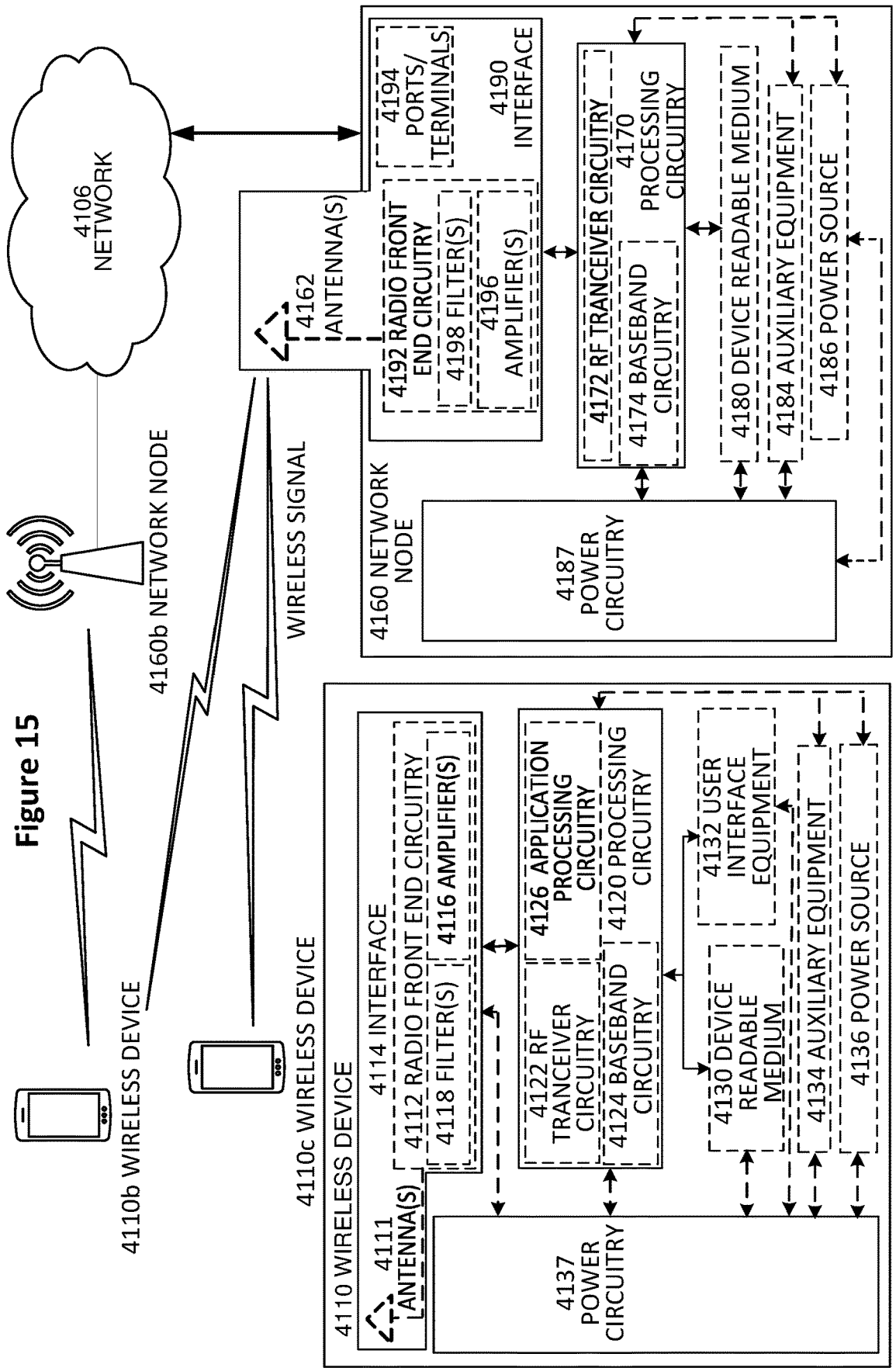
FIG. 15 is a block diagram of a wireless network in accordance with some embodiments.

FIG. 15 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 15 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 16:
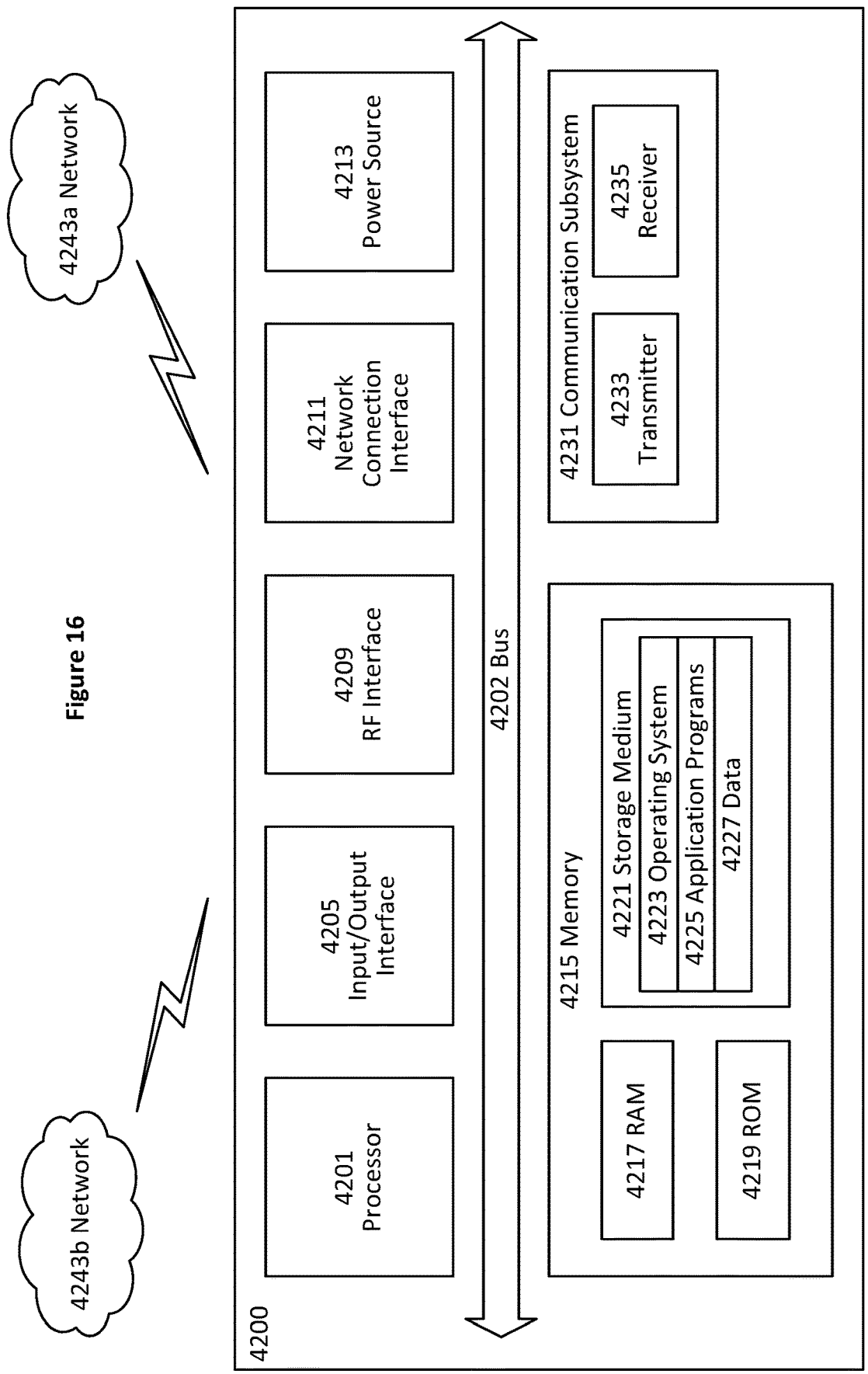
FIG. 16 is a block diagram of a user equipment in accordance with some embodiments

FIG. 16 illustrates a user Equipment in accordance with some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 16, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 17:
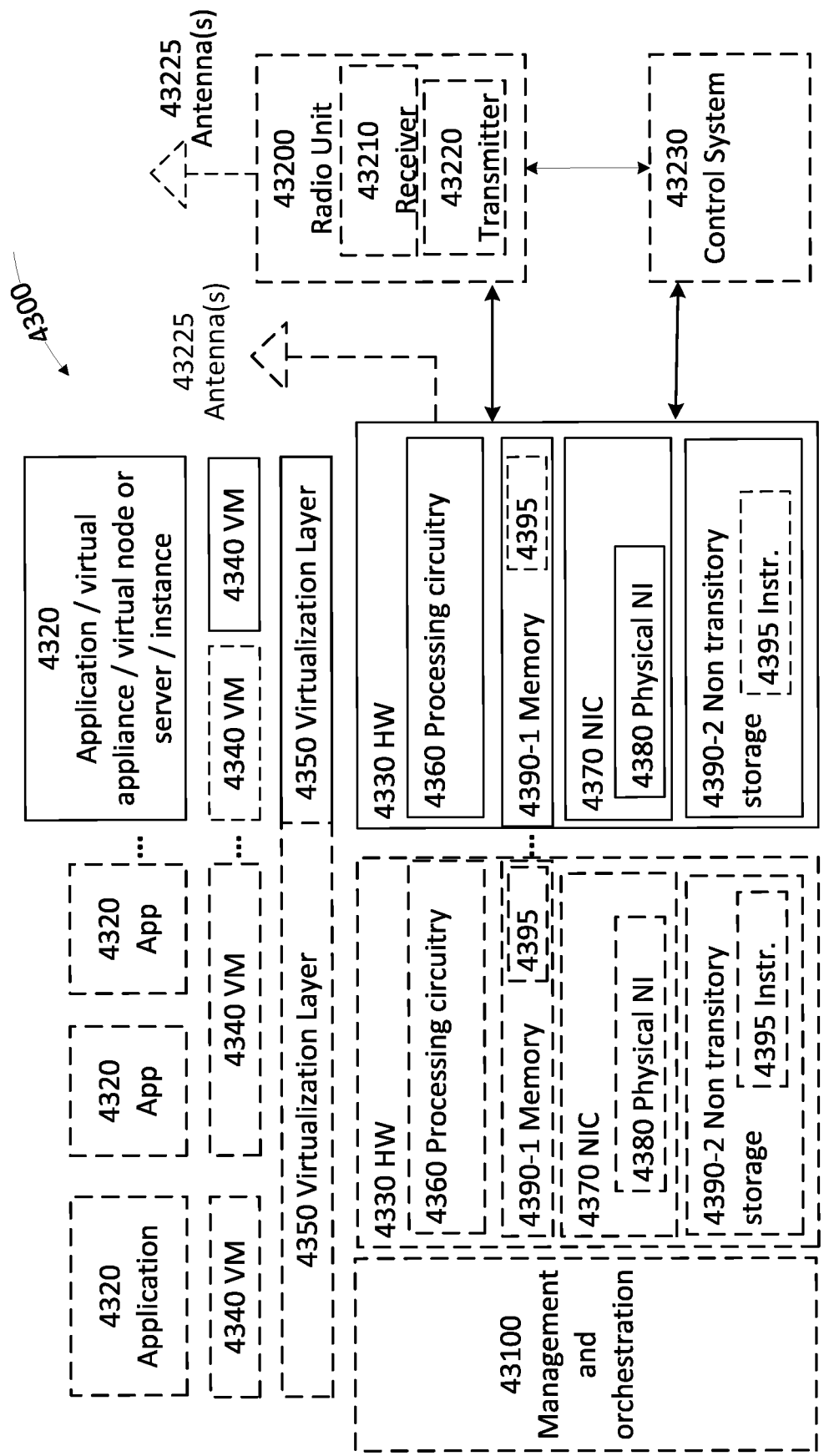
FIG. 17 is a block diagram of a virtualization environment in accordance with some embodiments.

FIG. 17 illustrates a virtualization environment in accordance with some embodiments.

FIG. 17 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 17, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 17.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 18:
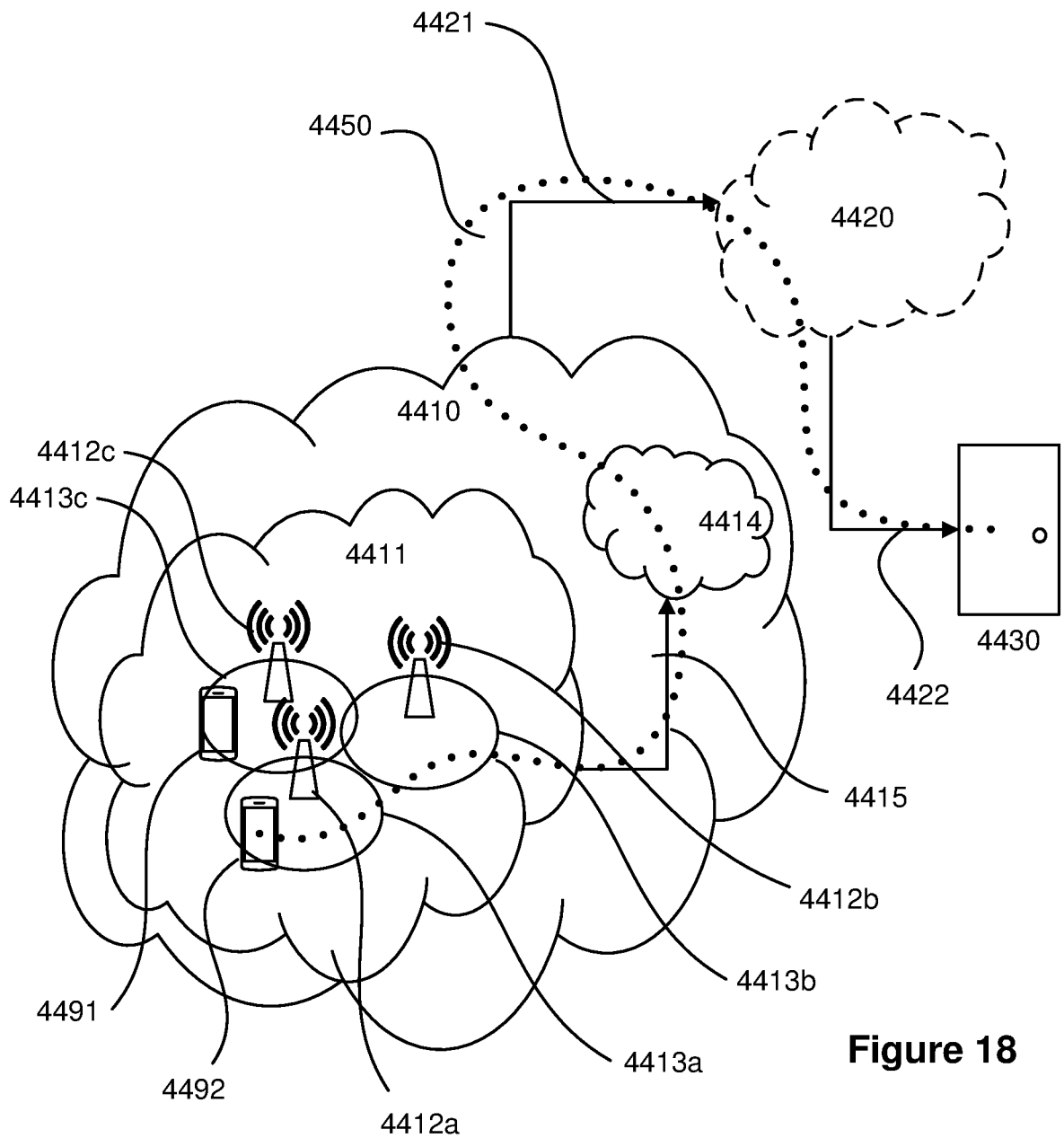
FIG. 18 is a block diagram of a telecommunication network connected via an intermediate network to a host computer in accordance with some embodiments.

FIG. 18 illustrates a telecommunication network connected via an intermediate network to a host computer in accordance with some embodiments.

With reference to FIG. 18, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 18 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 19:
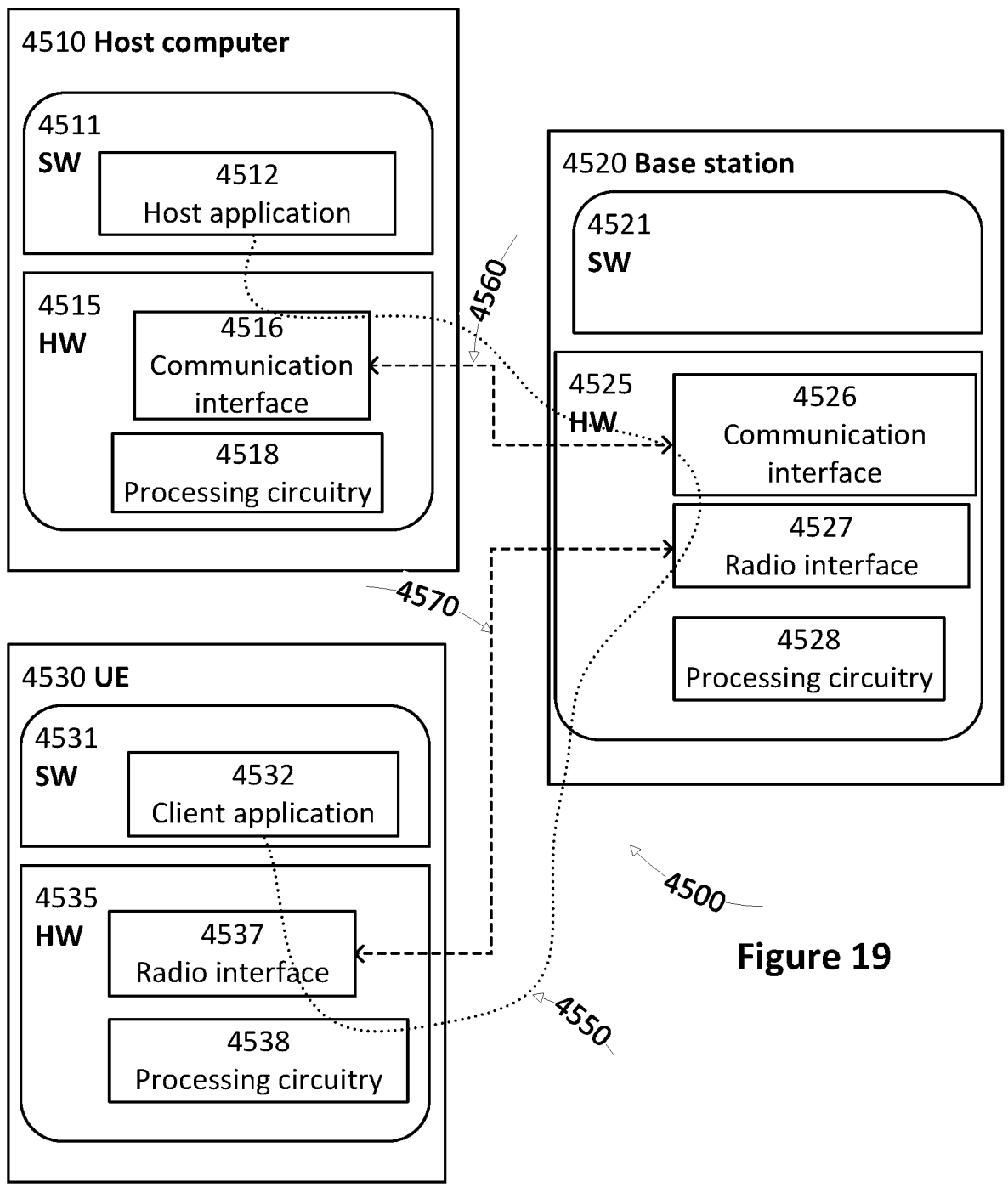
FIG. 19 is a block diagram of a host computer communicating via a base station with a user equipment over a partially wireless connection in accordance with some embodiments.

FIG. 19 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 19. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 19) served by base station 4520. Communication interface 4526 may be configured to facilitate connection 4560 to host computer 4510. Connection 4560 may be direct or it may pass through a core network (not shown in FIG. 19) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 19 may be similar or identical to host computer 4430, one of base stations 4412a, 4412b, 4412c and one of UEs 4491, 4492 of FIG. 18, respectively. This is to say, the inner workings of these entities may be as shown in FIG. 19 and independently, the surrounding network topology may be that of FIG. 18.

In FIG. 19, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 20:
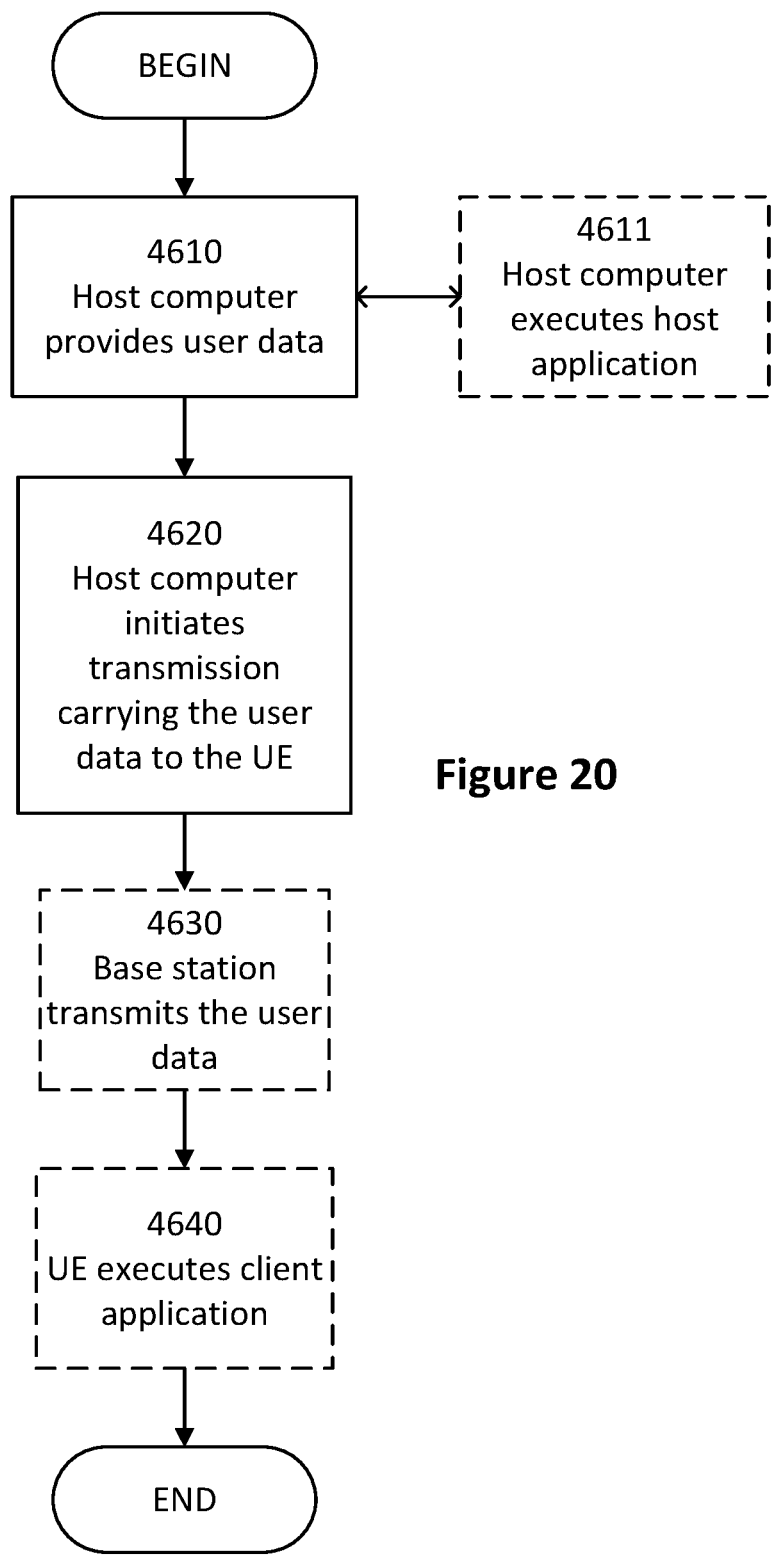
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 21:
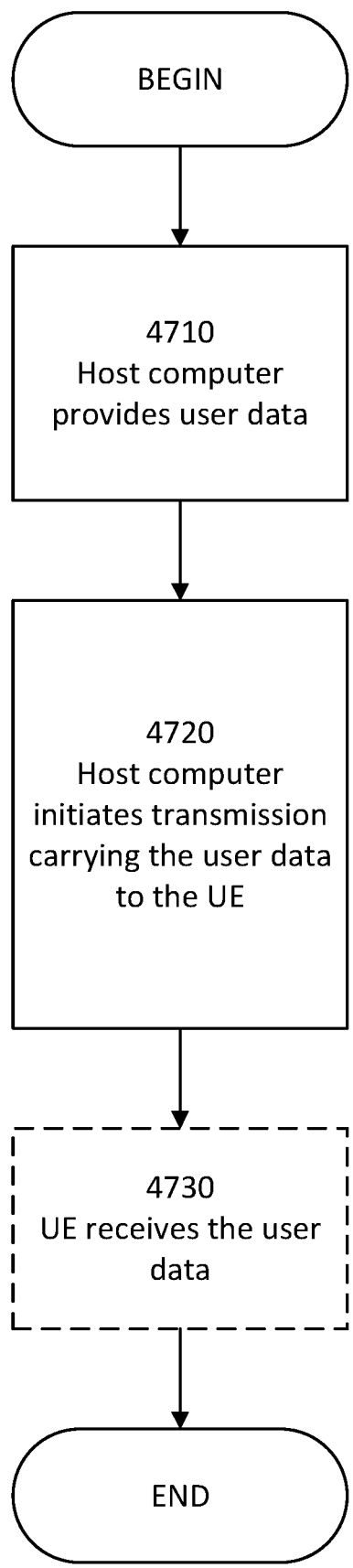
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 22:
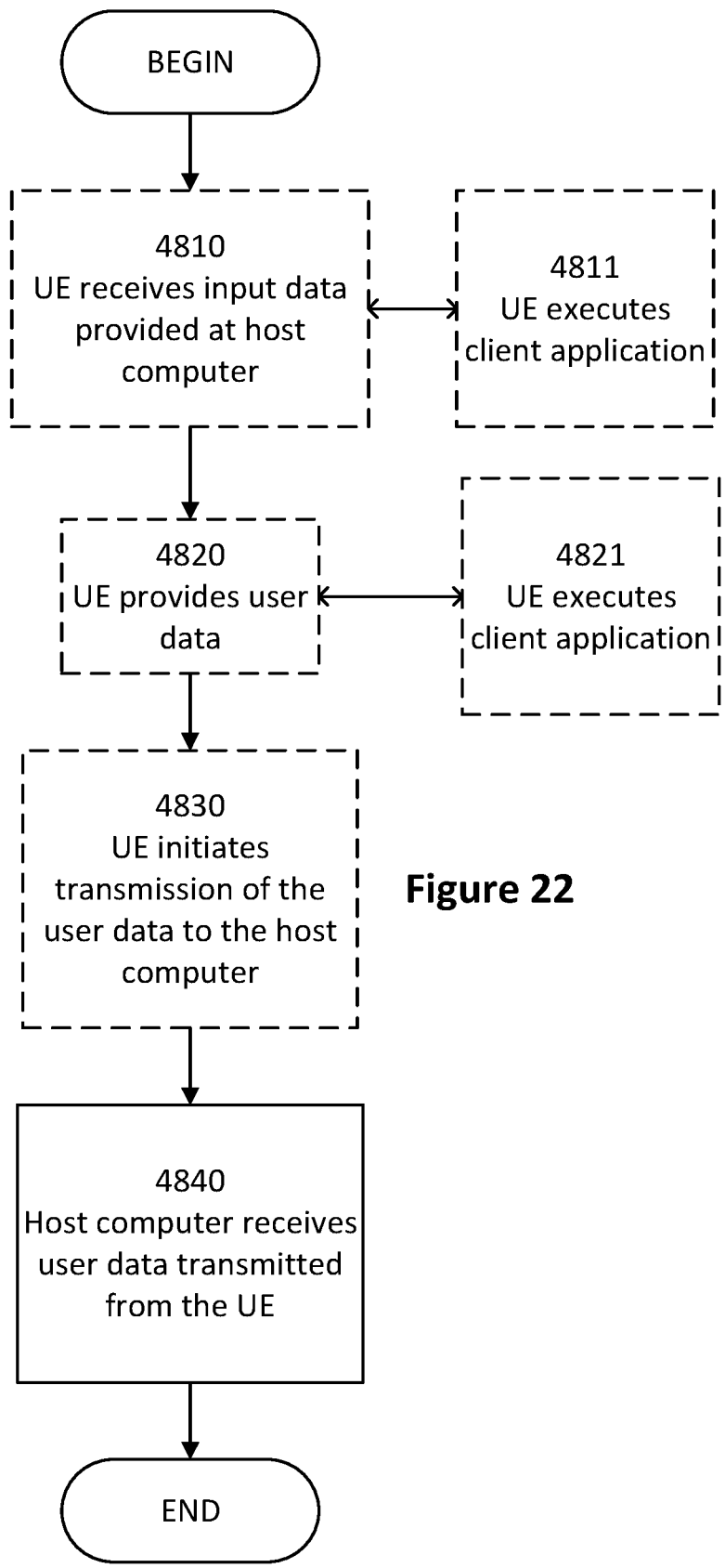
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 23:
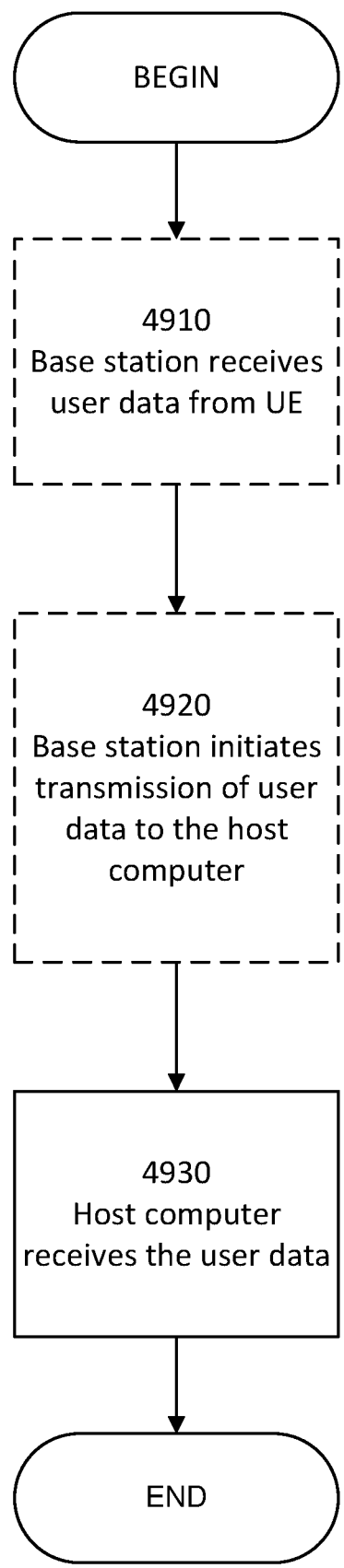
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1x RTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
S For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a session management function, SMF, node of a core network, CN, for a communication network, the method comprising:
receiving an association message from a user plane function, UPF, node of the CN, wherein the association message includes an indication that the UPF node supports a capability to modify session traffic in response to a handover;
receiving a protocol data unit, PDU, session create request message requesting creation of a PDU session for a communication device;
transmitting a policy control create request message responsive to receiving the PDU session create request message requesting creation of the PDU session for the communication device;
receiving a policy control create response message after transmitting the policy control create request message, wherein the policy control create response message is in response to the policy control create request message, and wherein the policy control create response message includes an indication that session traffic of the PDU session for the communication device is to be modified in response to handover;
selecting the UPF node to handle the PDU session for the communication device responsive to the indication that the UPF node supports the capability to modify session traffic in response to handover and responsive to the indication that session traffic of the PDU session for the communication device is to be modified in response to handover; and
transmitting a session establishment request message to the UPF node responsive to selecting the UPF node to handle the PDU session for the communication device, wherein the session establishment request message includes an indication to modify session traffic of the PDU session for the communication device in response to handover.

2. The method of claim 1, wherein the PDU session create request message is received from an access and mobility management function, AMF, node, the method further comprising:
transmitting a PDU session create response message to the AFM node responsive to the PDU session create request message, wherein the PDU session create response message is transmitted after transmitting the session establishment request message.

3. The method of claim 2 further comprising:
receiving a session establishment response message from the UPF node before transmitting the PDU session create response message, wherein the session establishment response message is responsive to the session establishment request message;
wherein the PDU session create response message is transmitted responsive to receiving the session establishment response message.

4. The method of claim 1 further comprising:
transmitting a handover event notification message to the UPF node responsive to handover of the communication device, wherein the handover notification message includes an identifier of the communication device.

5. The method of claim 4, wherein the handover event notification message is a second handover event notification message, the method further comprising:
transmitting a handover subscribe request message to the AMF node, wherein the handover subscribe request message includes the identifier of the communication device; and
receiving a first handover event notification message from the AMF node after transmitting the handover subscribe request message, wherein the first handover event notification message indicates handover of the communication device, and wherein the first handover event notification message includes the identifier of the communication device;
wherein the second handover event notification message is transmitted to the UPF node responsive to receiving the first handover event notification message from the AMF node.

6. The method of claim 5, wherein the handover subscribe request message is a first handover subscribe request message, the method further comprising:
receiving a second handover subscribe request message including the identifier of the communication device, wherein the second handover subscribe request message is received from the UPF node;
wherein the second handover event notification message is transmitted to the UPF node responsive to receiving the first handover notification message from the AMF node and responsive to receiving the second handover subscribe request message from the UPF node.

7. The method of claim 1 further comprising:
transmitting a quality of service enforcement rule, QER, message to the UPF node responsive to handover of the communication device, wherein the QER message includes an identifier of the communication device.

8. The method of claim 7, wherein the QER message is a second QER message, the method further comprising:
transmitting a handover subscribe request message to the AMF node, wherein the handover subscribe request message includes the identifier of the communication device; and
receiving a first handover event notification message from the AMF node after transmitting the handover subscribe request message, wherein the first handover event notification message indicates handover of the communication device, and wherein the first handover event notification message includes the identifier of the communication device;
transmitting a second handover event notification message to a policy control function, PCF, node, wherein the second handover event notification message indicates handover of the communication device, and wherein the second handover event notification message includes the identifier of the communication device; and
receiving a first QER message from the PCF node after transmitting the second handover event notification message to the PCF node;
wherein the second QER message is transmitted to the UPF node responsive to receiving the first QER message from the PCF node.

9. The method of claim 8, wherein the handover subscribe request message is a first handover subscribe request message, the method further comprising:
receiving a second handover subscribe request message including the identifier of the communication device, wherein the second handover subscribe request message is received from the PCF node;
wherein the second handover event notification message is transmitted to the PCF node responsive to receiving the first handover notification message from the AMF node and responsive to receiving the second handover subscribe request message from the PCF node.

10. The method of claim 1, further comprising:
transmitting an association request message to the UPF node;
wherein the association message is an association response message that is responsive to the association request message.

11. The method of claim 1, wherein the policy control create request message is transmitted to a policy control function, PCF, node of the CN, and wherein the policy control create response message is received from the PCF node of the CN.

12. A method of operating a user plane function, UPF, node of a core network, CN, for a communication network, the method comprising:
transmitting an association message to a session management function, SMF, node of the CN, wherein the association message includes an indication that the UPF node supports a capability to modify session traffic in response to a handover; and
receiving a session establishment request message from the SMF node, wherein the session establishment request message includes an indication to modify session traffic of a protocol data unit, PDU, session for the communication device in response to handover.

13. The method of claim 12 further comprising:
transmitting a session establishment response message to the SMF node responsive to receiving the session establishment request message.

14. The method of claim 12 further comprising:
providing session traffic for the communication device using the PDU session for the communication device responsive to receiving the session establishment request message.

15. The method of claim 14, wherein the session traffic is provided by the UPF node between the communication device and an application server using the PDU session for the communication device.

16. The method of claim 14 further comprising:
receiving a handover event notification message from the SMF while providing the session traffic for the communication device using the PDU session, wherein the handover event notification message includes an identifier of the communication device.

17. The method of claim 16 further comprising:
modifying provision of the session traffic for the communication device using the PDU session with a new handover cell responsive to receiving the handover event notification message.

18. The method of claim 17, wherein modifying provision of the session traffic comprises at least one of modifying a bit rate, window size, and/or buffer allocation used for the session traffic.

19. The method of claim 17, wherein modifying provisions of the session traffic comprises modifying an optimization used for provision of the session traffic for the communication device using the PDU session with the new handover cell.

20. The method of claim 16, the method further comprising:
transmitting a handover subscribe request message including the identifier of the communication device before receiving the handover event notification message, wherein the handover subscribe request message is transmitted to the SMF node.

21. The method of claim 14 further comprising:
receiving a quality of service enforcement rule, QER, message from the SMF node while providing the session traffic for the communication device using the PDU session, wherein the QER message includes an identifier of the communication device.

22. The method of claim 21 further comprising:
modifying provision of the session traffic for the communication device using the PDU session with a new handover cell responsive to receiving the QER message.

23. The method of claim 22, wherein modifying provision of the session traffic comprises at least one of: modifying a bit rate, modifying a window size, modifying a buffer allocation used for the session traffic, and/or modifying an optimization used for provision of the session traffic for the communication device using the PDU session with the new handover cell.

24. The method of claim 22, wherein the QER message includes an indication defining a bit rate for the session traffic for the communication device using the PDU session, and wherein modifying provision of the session traffic comprises modifying provision of the session traffic based on the bit rate.

* * * * *